US011492431B2

(12) United States Patent
Chen et al.

(10) Patent No.: US 11,492,431 B2
(45) Date of Patent: Nov. 8, 2022

(54) FLUORINATED COPOLYMER HAVING SULFONYL PENDANT GROUPS AND COMPOSITIONS AND ARTICLES INCLUDING THE SAME

(71) Applicant: 3M INNOVATIVE PROPERTIES COMPANY, St. Paul, MN (US)

(72) Inventors: Lisa P. Chen, St. Paul, MN (US); Gregg D. Dahlke, St. Paul, MN (US); Denis Duchesne, Woodbury, MN (US); Steven J. Hamrock, Stillwater, MN (US); Klaus Hintzer, Kastl (DE); Markus E. Hirschberg, Mühldorf (DE); Arne Thaler, Emmerting (DE); Tilman C. Zipplies, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 206 days.

(21) Appl. No.: 16/645,882

(22) PCT Filed: Sep. 14, 2018

(86) PCT No.: PCT/US2018/051094
§ 371 (c)(1),
(2) Date: Mar. 10, 2020

(87) PCT Pub. No.: WO2019/055791
PCT Pub. Date: Mar. 21, 2019

(65) Prior Publication Data
US 2020/0277420 A1 Sep. 3, 2020

Related U.S. Application Data

(60) Provisional application No. 62/730,648, filed on Sep. 13, 2018, provisional application No. 62/558,655, filed on Sep. 14, 2017, provisional application No. 62/558,671, filed on Sep. 14, 2017.

(51) Int. Cl.
| | | |
|---|---|---|
| *C08F 214/26* | (2006.01) |
| *C08F 8/12* | (2006.01) |
| *C08F 214/18* | (2006.01) |
| *C08F 8/44* | (2006.01) |
| *C08F 216/14* | (2006.01) |
| *C08F 2/10* | (2006.01) |
| *C08J 5/22* | (2006.01) |
| *C09D 11/52* | (2014.01) |
| *H01M 8/1004* | (2016.01) |
| *H01M 8/1039* | (2016.01) |
| *H01M 4/86* | (2006.01) |
| *H01M 8/1023* | (2016.01) |
| *H01M 8/10* | (2016.01) |

(52) U.S. Cl.
CPC ............ *C08F 214/262* (2013.01); *C08F 2/10* (2013.01); *C08F 8/12* (2013.01); *C08F 8/44* (2013.01); *C08F 214/184* (2013.01); *C08J 5/225* (2013.01); *C09D 11/52* (2013.01); *H01M 4/8668* (2013.01); *H01M 8/1004* (2013.01); *H01M 8/1023* (2013.01); *H01M 8/1039* (2013.01); *C08F 216/1416* (2013.01); *C08F 216/1475* (2020.02); *C08F 2800/10* (2013.01); *H01M 2008/1095* (2013.01); *H01M 2300/0082* (2013.01)

(58) Field of Classification Search
None
See application file for complete search history.

(56) References Cited

U.S. PATENT DOCUMENTS

| | | |
|---|---|---|
| 2,559,752 A | 7/1951 | Berry |
| 3,282,875 A | 11/1966 | Connolly |
| 3,718,627 A | 2/1973 | Grot |
| 4,267,364 A | 5/1981 | Grot |
| 4,273,728 A | 6/1981 | Krespan |
| 4,273,729 A | 6/1981 | Krespan |
| 4,275,225 A | 6/1981 | Krespan |
| 4,292,449 A | 9/1981 | Krespan |
| 4,349,650 A | 9/1982 | Krespan |
| 4,358,545 A | 11/1982 | Ezzell |
| 4,423,197 A | 12/1983 | Behr |

(Continued)

FOREIGN PATENT DOCUMENTS

| | | |
|---|---|---|
| CN | 102264775 | 11/2011 |
| DE | 2753886 | 12/1977 |

(Continued)

OTHER PUBLICATIONS

Gronwald, "Synthesis of Difluoroethyl Perfluorosulfonate Monomer and its Application", Journal of Fluorine Chemistry, Jun. 2008, vol. 129, No. 6, pp. 535-540.
Kongkanand, "The Priority and Challenge of High-Power Performance of Low-Platinum Proton-Exchange Membrane Fuel Cells", J. Phys. Chem. Lett., Mar. 2016, vol. 7, No. 7, pp. 1127-1137.
Petrov, "A New Route to Polyfluorinated Trifluoromethanesulfonates Synthesis of Perfluoroallyl and Perfluorobenzyl Triflates", Journal of Fluorine Chemistry, Jul. 1995, vol. 73, No. 1, pp. 17-19.
Scheirs, Modern Fluoropolymers, 241 (1997).

(Continued)

Primary Examiner — Nicole M. Buie-Hatcher
(74) Attorney, Agent, or Firm — Julie Lapos-Kuchar; Kathleen B. Gross

(57) ABSTRACT

The copolymer includes divalent units represented by formula —[$CF_2$—$CF_2$]—, divalent units represented by formula; and one or more divalent units independently represented by formula: The copolymer has an —$SO_2X$ equivalent weight in a range from 300 to 2000. A polymer electrolyte membrane that includes the copolymer and a membrane electrode assembly that includes such a polymer electrolyte membrane are also provided.

11 Claims, No Drawings

(56) References Cited

U.S. PATENT DOCUMENTS

| | | |
|---|---|---|
| 4,433,082 A | 2/1984 | Grot |
| 4,621,116 A | 11/1986 | Morgan |
| 4,962,282 A | 10/1990 | Marraccini |
| 5,010,130 A | 4/1991 | Chapman, Jr |
| 5,089,200 A | 2/1992 | Chapman, Jr |
| 5,093,409 A | 3/1992 | Buckmaster |
| 5,182,342 A | 1/1993 | Feiring |
| 5,285,002 A | 2/1994 | Grootaert |
| 5,378,782 A | 1/1995 | Grootaert |
| 5,442,097 A | 8/1995 | Obermeier |
| 5,463,021 A | 10/1995 | Beyer |
| 5,780,552 A | 7/1998 | Kerbow |
| 5,912,280 A | 6/1999 | Anton |
| 6,133,389 A | 10/2000 | Anolick |
| 6,197,903 B1 | 3/2001 | Maccone |
| 6,255,536 B1 | 7/2001 | Worm |
| 6,274,677 B1 | 8/2001 | Tatemoto |
| 6,294,627 B1 | 9/2001 | Worm |
| 6,387,570 B1 | 5/2002 | Nakamura |
| 6,388,139 B1 | 5/2002 | Resnick |
| 6,429,258 B1 | 8/2002 | Morgan |
| 6,613,941 B1 | 9/2003 | Felix |
| 6,624,328 B1 | 9/2003 | Guerra |
| 6,706,193 B1 | 3/2004 | Burkard |
| 6,743,508 B2 | 6/2004 | Kono |
| 6,780,544 B2 | 8/2004 | Noh |
| 6,794,550 B2 | 9/2004 | Hintzer |
| 7,018,541 B2 | 3/2006 | Hintzer |
| 7,071,271 B2 | 7/2006 | Thaler |
| 7,214,740 B2 | 5/2007 | Lochhaas |
| 7,265,162 B2 | 9/2007 | Yandrasits |
| 7,304,101 B2 | 12/2007 | Hintzer |
| 7,455,934 B1 | 11/2008 | Araki |
| 7,456,314 B2 | 11/2008 | Yang |
| 7,671,112 B2 | 3/2010 | Hintzer |
| 7,923,519 B2 | 4/2011 | Kono |
| 8,034,880 B2 | 10/2011 | Ino |
| 8,058,376 B2 | 11/2011 | Aten |
| 8,227,139 B2 | 7/2012 | Watakabe |
| 8,367,267 B2 | 2/2013 | Frey |
| 8,436,053 B2 | 5/2013 | Leffew |
| 8,470,943 B2 | 6/2013 | Watakabe |
| 8,628,871 B2 | 1/2014 | Frey |
| 9,034,538 B2 | 5/2015 | Frey |
| 9,416,251 B2 | 8/2016 | Hintzer |
| 9,711,816 B2 | 7/2017 | Lochhaas |
| 10,040,875 B2 | 8/2018 | Merlo |
| 10,189,927 B2 | 1/2019 | Ino |
| 10,676,555 B2 | 6/2020 | Duchesne |
| 10,717,795 B2 | 7/2020 | Duchesne |
| 10,964,967 B2 | 3/2021 | Coleman |
| 11,155,661 B2 * | 10/2021 | Dahlke ............... H01M 8/1004 |
| 2001/0018144 A1 | 8/2001 | Watakabe |
| 2002/0160272 A1 | 10/2002 | Tanaka |
| 2003/0023015 A1 | 1/2003 | Tatemoto |
| 2004/0107869 A1 | 6/2004 | Velamakanni |
| 2006/0199898 A1 | 9/2006 | Funaki |
| 2006/0223924 A1 | 10/2006 | Tsuda |
| 2006/0281946 A1 | 12/2006 | Morita |
| 2007/0015865 A1 | 1/2007 | Hintzer |
| 2007/0060699 A1 | 3/2007 | Tsuda |
| 2007/0117915 A1 | 5/2007 | Funaki |
| 2007/0129500 A1 | 6/2007 | Honda |
| 2007/0142513 A1 | 6/2007 | Tsuda |
| 2007/0142541 A1 | 6/2007 | Hintzer |
| 2007/0148517 A1 * | 6/2007 | Merlo ................ H01M 8/1067 |
| | | 429/483 |
| 2007/0243388 A1 | 10/2007 | Kono |
| 2008/0161612 A1 | 7/2008 | Yang |
| 2010/0087553 A1 | 4/2010 | Arcella |
| 2010/0311906 A1 | 12/2010 | Lavallee |
| 2011/0303868 A1 | 12/2011 | Sienkiewicz |
| 2013/0245219 A1 | 9/2013 | Perry |
| 2013/0252134 A1 | 9/2013 | Takami |
| 2013/0253157 A1 | 9/2013 | Takami |
| 2014/0141357 A1 * | 5/2014 | Lochhaas ............... C08J 5/2237 |
| | | 429/482 |
| 2014/0255703 A1 | 9/2014 | Aten |
| 2015/0303517 A1 * | 10/2015 | Kageura ............. H01M 10/054 |
| | | 429/200 |
| 2017/0183435 A1 | 6/2017 | Ino |
| 2018/0273663 A1 | 9/2018 | Dahlke |
| 2019/0027769 A1 | 1/2019 | Dahlke |
| 2020/0199259 A1 | 6/2020 | Chen |

FOREIGN PATENT DOCUMENTS

| | | |
|---|---|---|
| GB | 1286859 | 8/1972 |
| JP | 2000-188111 | 7/2000 |
| JP | 2006-232704 | 9/2006 |
| JP | 2010-018674 | 1/2010 |
| JP | 2011-040363 | 2/2011 |
| JP | 2013-181128 | 9/2013 |
| WO | WO 2000-024709 | 5/2000 |
| WO | WO 2013-019614 | 2/2013 |
| WO | WO 2014-023611 | 2/2014 |
| WO | WO-2015182676 A1 * | 12/2015 .......... H01M 8/1067 |
| WO | WO 2017-053563 | 3/2017 |
| WO | WO-2017053563 A1 * | 3/2017 .......... C08F 214/262 |
| WO | WO 2019-055793 | 3/2019 |
| WO | WO 2019-055799 | 3/2019 |

OTHER PUBLICATIONS

Uematsu, "Synthesis of Novel Perfluorosulfonamide Monomers and their Application", Journal of Fluorine Chemistry, Aug. 2006, vol. 127, No. 8, pp. 1087-1095.

International Search Report for PCT International Application No. PCT/US2018/051094, dated Oct. 31, 2018, 4 pages.

International Search Report for PCT International Application No. PCT/US2018/051096, dated Nov. 6, 2018, 5 pages.

International Search Report for PCT International Application No. PCT/US2018/051104, dated Oct. 31, 2018, 4 pages.

* cited by examiner

FLUORINATED COPOLYMER HAVING SULFONYL PENDANT GROUPS AND COMPOSITIONS AND ARTICLES INCLUDING THE SAME

CROSS-REFERENCE TO RELATED APPLICATION

This application is a national stage filing under 35 U.S.C. 371 of PCT/US2018/051094, filed Sep. 14, 2018, which claims priority to U.S. Provisional Application Nos. 62/558,655 and 62/558,671, filed Sep. 14, 2017, and 62/730,648, filed Sep. 13, 2018, the disclosures of which are incorporated by reference in their entirety herein.

BACKGROUND

Copolymers of tetrafluoroethylene and polyfluorovinyloxy monomers including sulfonyl fluoride pendant groups have been made. See, for example, U.S. Pat. No. 3,282,875 (Connolly), U.S. Pat. No. 3,718,627 (Grot), and U.S. Pat. No. 4,267,364 (Grot). Copolymers of fluorinated olefins and polyfluoroallyloxy sulfonyl fluorides have been made. See, for example, U.S. Pat. No. 4,273,729 (Krespan) and U.S. Pat. No. 8,227,139 (Watakabe), and International Pat. Appl. Pub. No. WO 00/24709 (Farnham et al.). Hydrolysis of the sulfonyl fluoride of these copolymers to form an acid or acid salt provides ionic copolymers, which are also called ionomers.

Certain recently disclosed ionomers are said to have high oxygen permeability. See, for example, U.S. Pat. Appl. Pub. Nos. 2017/0183435 (Ino), 2013/0253157 (Takami), 2013/0245219 (Perry), and 2013/0252134 (Takami), and U.S. Pat. No. 8,470,943 (Watakabe).

SUMMARY

While ionomers made from tetrafluoroethylene and polyfluorovinyloxy or polyfluoroallyloxy sulfonyl fluorides monomers are known, certain of these materials are highly crystalline and difficult to disperse in common solvent (e.g., water and alcohol mixtures) at high solid percentages (e.g., at least 20% solids). Achieving high percent solids may be particularly challenging when an ionomer of high equivalent weight is desired. A high solids percentage is useful for making thicker membranes for membrane electrode assemblies. While for some applications thin membranes are desirable (e.g., automotive membranes can be about 12 micrometers thick), other applications require thicker membranes (e.g., greater than 30 micrometers or greater than 50 micrometers). Increasing thickness by using higher percent solids is advantageous over a multi-pass process to build thickness. Furthermore, increasing the solubility in common solvents can obviate the need for using high boiling solvents such as DMF or DMSO and allow for using lower manufacturing temperatures during the manufacturing process of ionomer membranes. Operating at lower coating temperature for the membrane or electrode catalyst particle help protect the overall article of manufacture.

Easy-to-process ionomers with low hydrogen permeation for membrane applications in fuel cells or high oxygen permeation ionomers for electrode applications are also difficult to achieve. Membrane electrode assemblies useful in solid polymer electrolyte fuel cells include electrode catalyst layers including a catalyst (e.g., platinum) and an ionomer. Since the catalysts (e.g., platinum) are typically expensive, decreasing the amount of catalyst can be desirable. For an ionomer used in the electrode, high oxygen permeability is desirable to minimize resistance. In the ionic catalyst layer, it is desirable to have a high oxygen permeability without lowering the ionic conductivity.

The copolymers of the present disclosure include longer chain or branched vinyl ether or allyl ether monomer units in addition to tetrafluoroethylene and sulfonyl group-containing monomer units. Inclusion of such vinyl and allyl ethers can lead to an improved processability profile in common solvents by improving solubility. Inclusion of such monomer units can also typically provide low hydrogen permeation for membrane applications in fuel cells or high oxygen permeation ionomers for electrode applications.

In one aspect, the present disclosure provides a copolymer including divalent units represented by formula [CF$_2$—CF$_2$]—, divalent units independently represented by formula:

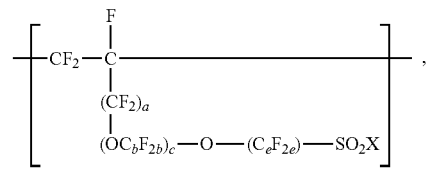

and one or more divalent units independently represented by formula:

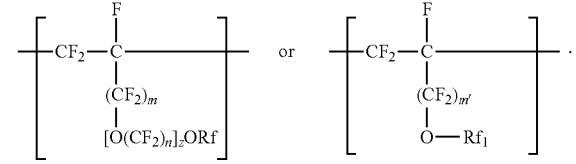

In these formulas, a is 0 or 1, b is a number from 2 to 8, c is a number from 0 to 2, and e is a number from 1 to 8. In each —SO$_2$X, X is independently F, —NZH, —NZSO$_2$(CF$_2$)$_{1\text{-}6}$SO$_2$X', —NZ[SO$_2$(CF$_2$)$_d$SO$_2$NZ]$_{1\text{-}10}$SO$_2$(CF$_2$)$_d$SO$_2$X', or —OZ, wherein each Z is independently a hydrogen, alkyl having up to four carbon atoms, an alkali-metal cation, or a quaternary ammonium cation, X' is independently —NZH or —OZ, each d is independently 1 to 6, Rf is a linear or branched perfluoroalkyl group having from 1 to 8 carbon atoms and optionally interrupted by one or more —O— groups, z is 1 or 2, each n is independently from 1, 3, or 4, m and m' are each independently 0 or 1, and Rf$_1$ is a branched perfluoroalkyl group having from 3 to 8 carbon atoms, with the proviso that if z is 2, one n may also be 2, with the further proviso that if a is 1, n may also be 2, and with the further proviso that when m' is 1, Rf$_1$ is a branched perfluoroalkyl group having from 3 to 8 carbon atoms or a linear perfluoroalkyl group having 5 to 8 carbon atoms. The copolymer has an —SO$_2$X equivalent weight in a range from 300 to 2000. In some embodiments, X is independently F, —NZH, or —OZ, wherein each Z is independently a hydrogen, alkyl having up to four carbon atoms, an alkali-metal cation, or a quaternary ammonium cation.

In another aspect, the present disclosure provides a copolymer including divalent units represented by formula —[CF$_2$—CF$_2$]—; divalent units independently represented by formula:

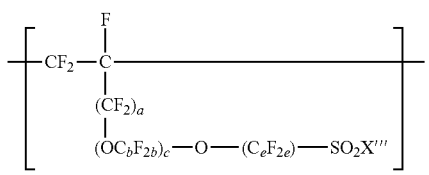

and one or more other fluorinated divalent units independently represented by formula:

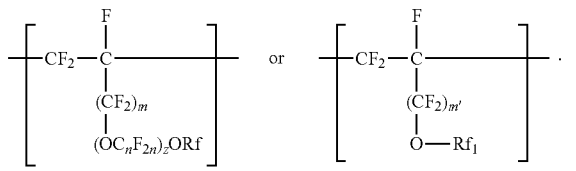

In these formulas, a is 0 or 1, b is 2 to 8, c is 0 to 2, e is 1 to 8, and each X''' is independently —NZH, —NZSO$_2$(CF$_2$)$_{1-6}$SO$_2$X', or —NZ[SO$_2$(CF$_2$)$_d$SO$_2$NZ]$_{1-10}$SO$_2$(CF$_2$)$_d$SO$_2$X', wherein Z is a hydrogen, alkyl having up to four carbon atoms, an alkali-metal cation or a quaternary ammonium cation, X' is independently —NZH or —OZ, each d is independently 1 to 6, Rf is a linear or branched perfluoroalkyl group having from 1 to 8 carbon atoms and optionally interrupted by one or more —O— groups, z is 1 or 2, each n is independently from 1 to 4, m is 0 or 1, m' is 0 or 1, and Rf$_1$ is a branched perfluoroalkyl group having from 3 to 8 carbon atoms, with the proviso that when m' is 1, Rf$_1$ is a branched perfluoroalkyl group having from 3 to 8 carbon atoms or a linear perfluoroalkyl group having 5 to 8 carbon atoms The copolymer has an —SO$_2$X''' equivalent weight in a range from 300 to 2000.

In another aspect, the present disclosure provides a polymer electrolyte membrane that includes the copolymer of the present disclosure.

In another aspect, the present disclosure provides a catalyst ink that includes the copolymer of the present disclosure.

In another aspect, the present disclosure provides a membrane electrode assembly that includes at least one of such a polymer electrolyte membrane or catalyst ink.

In another aspect, the present disclosure provides a binder for an electrochemical system that includes the copolymer of the present disclosure.

In another aspect, the present disclosure provides a battery or electrode that includes such a binder.

In this application:

Terms such as "a", "an" and "the" are not intended to refer to only a singular entity but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

"Alkyl group" and the prefix "alk-" are inclusive of both straight chain and branched chain groups and of cyclic groups. Unless otherwise specified, alkyl groups herein have up to 20 carbon atoms. Cyclic groups can be monocyclic or polycyclic and, in some embodiments, have from 3 to 10 ring carbon atoms.

The terms "aryl" and "arylene" as used herein include carbocyclic aromatic rings or ring systems, for example, having 1, 2, or 3 rings and optionally containing at least one heteroatom (e.g., O, S, or N) in the ring optionally substituted by up to five substituents including one or more alkyl groups having up to 4 carbon atoms (e.g., methyl or ethyl), alkoxy having up to 4 carbon atoms, halo (i.e., fluoro, chloro, bromo or iodo), hydroxy, or nitro groups. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl.

"Alkylene" is the multivalent (e.g., divalent or trivalent) form of the "alkyl" groups defined above. "Arylene" is the multivalent (e.g., divalent or trivalent) form of the "aryl" groups defined above.

"Arylalkylene" refers to an "alkylene" moiety to which an aryl group is attached. "Alkylarylene" refers to an "arylene" moiety to which an alkyl group is attached.

The terms "perfluoro" and "perfluorinated" refer to groups in which all C—H bonds are replaced by C—F bonds.

The phrase "interrupted by at least one —O— group", for example, with regard to a perfluoroalkyl or perfluoroalkylene group refers to having part of the perfluoroalkyl or perfluoroalkylene on both sides of the —O— group. For example, —CF$_2$CF$_2$—O—CF$_2$—CF$_2$— is a perfluoroalkylene group interrupted by an —O—.

All numerical ranges are inclusive of their endpoints and nonintegral values between the endpoints unless otherwise stated (e.g., 1 to 5 includes 1, 1.5, 2, 2.75, 3, 3.80, 4, 5, etc.).

DETAILED DESCRIPTION

The copolymer according to the present disclosure includes divalent units represented by formula —[CF$_2$—CF$_2$]—. In some embodiments, the copolymer according to the present disclosure comprise at least 60 mole % of divalent units represented by formula —[CF$_2$—CF$_2$]—, based on the total moles of divalent units. In some embodiments, the copolymer comprises at least 65, 70, 75, 80, or 90 mole % of divalent units represented by formula —[CF$_2$—CF$_2$]—, based on the total moles of divalent units. Divalent units represented by formula —[CF$_2$—CF$_2$]— are incorporated into the copolymer by copolymerizing components including tetrafluoroethylene (TFE). In some embodiments, the components to be polymerized include at least 60, 65, 70, 75, 80, or 90 mole % TFE, based on the total moles of components to be polymerized.

The copolymer according to the present disclosure includes divalent units independently represented by formula:

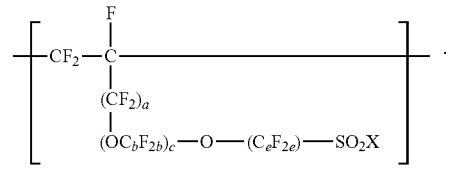

In this formula, a is 0 or 1, b is a number from 2 to 8, c is a number from 0 to 2, and e is a number from 1 to 8. In some embodiments, b is a number from 2 to 6 or 2 to 4. In some embodiments, b is 2. In some embodiments, e is a number from 1 to 6 or 2 to 4. In some embodiments, e is 2. In some embodiments, e is 4. In some embodiments, c is 0 or 1. In some embodiments, c is 0. In some embodiments, c is 0, and e is 2 or 4. In some embodiments, c is 0, and e is 3 to 8, 3 to 6, 3 to 4, or 4. In some embodiments, at least one of c is 1 or 2 ore is 3 to 8, 3 to 6, 3 to 4, or 4. In some embodiments, when a and c are 0, then e is 3 to 8, 3 to 6, 3 to 4, or 4. In some embodiments, b is 3, c is 1, and e is 2. In some embodiments, b is 2 or 3, c is 1, and e is 2 or 4. In some embodiments, a, b, c, and e may be selected to provide greater than 2, at least 3, or at least 4 carbon atoms. $C_eF_{2e}$ may be linear or branched. In some embodiments, $C_eF_{2e}$ can be written as $(CF_2)_e$, which refers to a linear perfluoroalkylene group. When c is 2, the b in the two $C_bF_{2b}$ groups may be independently selected. However, within a $C_bF_{2b}$ group, a person skilled in the art would understand that b is not independently selected. Also in this formula and in any —SO$_2$X end groups that may be present, X is independently —F, —NZH, —NZSO$_2$(CF$_2$)$_{1-6}$SO$_2$X', —NZ[SO$_2$(CF$_2$)$_d$SO$_2$NZ]$_{1-10}$SO$_2$(CF$_2$)$_d$SO$_2$X' (in which each d is independently 1 to 6, 1 to 4, or 2 to 4), or —OZ. In some embodiments, X is independently —F, —NZH, or —OZ. In some embodiments, X is —NZH or —OZ. In some embodiments, X is —OZ. In some embodiments, X is independently —NZH, —NZSO$_2$(CF$_2$)$_{1-6}$SO$_2$X', or —NZ[SO$_2$(CF$_2$)$_d$SO$_2$NZ]$_{1-10}$SO$_2$(CF$_2$)$_d$SO$_2$X'. X' is independently —NZH or —OZ (in some embodiments, —OZ). In any of these embodiments, each Z is independently a hydrogen, alkyl having up to 4, 3, 2, or 1 carbon atoms, an alkali metal cation, or a quaternary ammonium cation. The quaternary ammonium cation can be substituted with any combination of hydrogen and alkyl groups, in some embodiments, alkyl groups independently having from one to four carbon atoms. In some embodiments, Z is an alkali-metal cation. In some embodiments, Z is a sodium or lithium cation. In some embodiments, Z is a sodium cation. Copolymers having divalent units represented by this formula can be prepared by copolymerizing components including at least one polyfluoroallyloxy or polyfluorovinyloxy compound represented by formula CF$_2$=CF(CF$_2$)$_a$—(OC$_b$F$_{2b}$)$_c$—O—(C$_e$F$_{2e}$)—SO$_2$X", in which a, b, c, and e are as defined above in any of their embodiments, and each X" is independently —F, —NZH, or —OZ. Suitable polyfluoroallyloxy and polyfluorovinyloxy compounds of this formula include CF$_2$=CFCF$_2$—O—CF$_2$—SO$_2$X", CF$_2$=CFCF$_2$—O—CF$_2$CF$_2$—SO$_2$X", CF$_2$=CFCF$_2$—O—CF$_2$CF$_2$CF$_2$—SO$_2$X", CF$_2$=CFCF$_2$—O—CF$_2$CF$_2$CF$_2$CF$_2$—SO$_2$X", CF$_2$=CFCF$_2$—O—CF$_2$CF(CF$_3$)—O—(CF$_2$)$_e$—SO$_2$X", CF$_2$=CF—O—CF$_2$—SO$_2$X", CF$_2$=CF—O—CF$_2$CF$_2$—SO$_2$X", CF$_2$=CF—O—CF$_2$CF$_2$CF$_2$—SO$_2$X", CF$_2$=CF—O—CF$_2$CF$_2$CF$_2$CF$_2$—SO$_2$X", and CF$_2$=CF—O—CF$_2$=CF(CF$_3$)—O—(CF$_2$)$_e$—SO$_2$X". In some embodiments, the compound represented by formula CF$_2$=CF(CF$_2$)$_a$—(OC$_b$F$_{2b}$)$_c$—O—(C$_e$F$_{2e}$)—SO$_2$X" is CF$_2$=CFCF$_2$—O—CF$_2$CF$_2$—SO$_2$X", CF$_2$=CF—O—CF$_2$CF$_2$—SO$_2$X", CF$_2$=CFCF$_2$—O—CF$_2$CF$_2$CF$_2$CF$_2$—SO$_2$X", or CF$_2$=CF—O—CF$_2$CF$_2$CF$_2$CF$_2$—SO2X". In some embodiments, the compound represented by formula CF$_2$CF(CF$_2$)$_a$—(OC$_b$F$_{2b}$)$_c$—O—(C$_e$F$_{2e}$)—SO$_2$X" is CF$_2$CFCF$_2$—O—CF$_2$CF$_2$—SO$_2$X", CF$_2$=CFCF$_2$—O—CF$_2$CF$_2$CF$_2$CF$_2$—SO$_2$X", or CF$_2$=CF—O—CF$_2$CF$_2$CF$_2$CF$_2$—SO$_2$X". In some embodiments, the compound represented by formula CF$_2$=CF(CF$_2$)$_a$—(OC$_b$F$_{2b}$)$_c$—O—(C$_e$F$_{2e}$)—SO$_2$X" is CF$_2$CFCF$_2$—O—CF$_2$CF$_2$—SO$_2$X" or CF$_2$=CFCF2-O—CF$_2$CF$_2$CF$_2$CF$_2$—SO$_2$X".

Compounds represented by formula CF$_2$=CF(CF$_2$)$_a$—(OC$_b$F$_{2b}$)$_c$—O—(C$_e$F$_{2e}$)—SO$_2$X" can be made by known methods. For example, acid fluorides represented by formula FSO$_2$(CF$_2$)$_{e-1}$—C(O)F or FSO$_2$(CF$_2$)$_c$—(OC$_b$F$_{2b}$)$_{c-1}$—C(O)F can be reacted with perfluoroallyl chloride, perfluoroallyl bromide, or perfluoroallyl fluorosulfate in the presence of potassium fluoride as described in U.S. Pat. No. 4,273,729 (Krespan) to make compounds of formula CF$_2$=CFCF$_2$—(OC$_b$F$_{2b}$)$_c$—O—(C$_e$F$_{2e}$)—SO$_2$F. Compounds of formula CF$_2$=CFCF$_2$—(OC$_b$F$_{2b}$)$_c$—O—(C$_e$F$_{2e}$)—SO$_2$F can be hydrolyzed with a base (e.g., alkali metal hydroxide or ammonium hydroxide) to provide a compound represented by formula CF$_2$=CFCF$_2$—(OC$_b$F$_{2b}$)$_c$—O—(C$_e$F$_{2e}$)—SO$_2$X'.

In some embodiments of the copolymer according to the present disclosure, at least some of the fluorinated divalent units are derived from at least one short-chain SO$_2$X"-containing vinyl ether monomer. Likewise, short-chain SO$_2$X"-containing vinyl ether monomers may be useful components to be polymerized in the methods according to the present disclosure. Short-chain SO$_2$X"-containing vinyl ether monomers represented by formula CF$_2$=CF—O—(CF$_2$)$_2$—SO$_2$X" (e.g., those represented by formula [CF$_2$=CF—O—(CF$_2$)$_2$—SO$_3$]M, where M is an alkali metal, and CF$_2$=CF—O—(CF$_2$)$_2$—SO$_2$NZH) can be made by known methods. Conveniently, a compound of formula [CF$_2$=CF—O—(CF$_2$)$_2$—SO$_3$]M can be prepared in three steps from the known compound represented by formula FC(O)—CF(CF$_3$)—O—(CF$_2$)$_2$—SO$_2$F. As reported in Gronwald, O., et al; "Synthesis of difluoroethyl perfluorosulfonate monomer and its application"; *J. Fluorine Chem.*, 2008, 129, 535-540, the acid fluoride can be combined with a methanol solution of sodium hydroxide to form the disodium salt, which can be dried and heated in dry diglyme to effect the carboxylation. FC(O)—CF(CF$_3$)—O—(CF$_2$)$_2$—SO$_2$F can be prepared by ring-opening and derivatization of tetrafluoroethane-β-sultone as described in U.S. Pat. No. 4,962,292 (Marraccini et al.). Compounds represented by formula CF$_2$=CF—O—(CF$_2$)$_a$—SO$_2$X" can also be prepared by hydrolyzing the products from the elimination of halogen from a compound of formula CF$_2$Cl—CFC—O—(CF$_2$)$_2$—SO$_2$F described in U.S. Pat. No. 6,388,139 (Resnick) and or hydrolyzing the products of decarboxylation of FSO$_2$—(CF$_2$)$_{3-4}$—O—CF(CF$_3$)—COO$^-$)$_p$M$^+$P described in U.S. Pat. No. 6,624,328 (Guerra). Compounds of formula CF$_2$=CF—O—(CF$_2$)$_2$—SO$_2$NH$_2$ can be prepared, for example, by reaction of a cyclic sulfone with one equivalent of LHMDS as described by Uematsu, N., et al. "Synthesis of novel perfluorosulfonamide monomers and their application"; *J. Fluorine Chem.*, 2006, 127, 1087-1095.

In some embodiments of the copolymer according to the present disclosure, the copolymer includes divalent units independently represented by formula

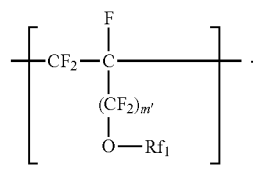

In this formula, m' is 0 or 1, and Rf$_1$ is a branched perfluoroalkyl group having from 3 to 8 carbon atoms. However, when m' is 1, Rf$_1$ can be a branched perfluoroalkyl group having from 3 to 8 carbon atoms or a linear perfluoroalkyl group having 5 to 8 carbon atoms. In some embodiments, $Rf_1$ is a branched perfluoroalkyl group having from 3 to 6 or 3 to 4 carbon atoms. An example of a useful perfluoroalkyl vinyl ether (PAVE) from which these divalent units are derived is perfluoroisopropyl vinyl ether ($CF_2$=$CFOCF(CF_3)_2$), also called iso-PPVE.

In some embodiments of the copolymer according to the present disclosure, the copolymer includes divalent units independently represented by formula

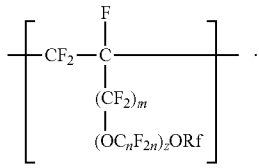

In this formula Rf is a linear or branched perfluoroalkyl group having from 1 to 8 carbon atoms and optionally interrupted by one or more —O— groups, z is 1 or 2, each n is independently from 1 to 4, and m is 0 or 1. In some embodiments, n is 1, 3, or 4, or from 1 to 3, or from 2 to 3, or from 2 to 4. One n can be 2, for example, when z is 2. In these cases, one n is 2, and the other is 1, 3, or 4. When a is 1 in any of the formulas described above, for example, n may also be 2. In some embodiments, n is 1 or 3. In some embodiments, n is 1. In some embodiments, n is not 3. When z is 2, the n in the two $C_nF_{2n}$ groups may be independently selected. However, within a $C_nF_{2n}$ group, a person skilled in the art would understand that n is not independently selected. $C_nF_{2n}$, may be linear or branched. In some embodiments, $C_nF_{2n}$ is branched, for example, $CF_2$—$CF(CF_3)$—. In some embodiments, $C_nF_{2n}$ can be written as $(CF_2)_n$, which refers to a linear perfluoroalkylene group. In these cases, the divalent units of this formula are represented by formula

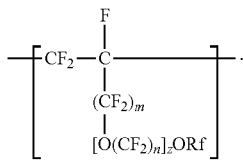

In some embodiments, $C_nF_{2n}$ is $CF_2$—$CF_2$—$CF_2$—. In some embodiments, $(OC_nF_{2n})_z$ is represented by —O—$(CF_2)_{1-4}[O(CF_2)_{1-4}]_{0-1}$. In some embodiments, Rf is a linear or branched perfluoroalkyl group having from 1 to 8 (or 1 to 6) carbon atoms that is optionally interrupted by up to 4, 3, or 2 —O— groups. In some embodiments, Rf is a perfluoroalkyl group having from 1 to 4 carbon atoms optionally interrupted by one —O— group.

Divalent units represented by formulas

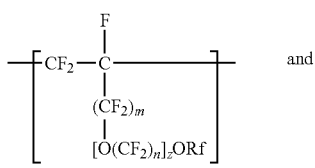

and

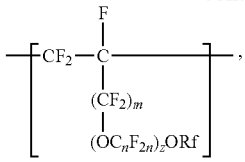

in which m is 0, typically arise from perfluoroalkoxyalkyl vinyl ethers. Suitable perfluoroalkoxyalkyl vinyl ethers (PAOVE) include those represented by formula $CF_2$=$CF[O(CF_2)_n]_z ORf$ and $CF_2$=$CF(OC_nF_{2n})_z ORf$, in which n, z, and Rf are as defined above in any of their embodiments. Examples of suitable perfluoroalkoxyalkyl vinyl ethers include $CF_2$=$CFOCF_2OCF_3$, $CF_2$=$CFOCF_2OCF_2CF_3$, $CF_2$=$CFOCF_2CF_2OCF_3$, $CF_2$=$CFOCF_2CF_2CF_2OCF_3$, $CF_2$=$CFOCF_2CF_2CF_2CF_2OCF_3$, $CF_2$=$CFOCF_2CF_2OCF_2CF_3$, $CF_2$=$CFOCF_2CF_2CF_2OCF_2CF_3$, $CF_2$=$CFOCF_2CF_2CF_2CF_2OCF_2CF_3$, $CF_2$=$CFOCF_2CF_2OCF_2OCF_3$, $CF_2$=$CFOCF_2CF_2OCF_2CF_2OCF_3$, $CF_2$=$CFOCF_2CF_2OCF_2CF_2CF_2OCF_3$, $CF_2$=$CFOCF_2CF_2OCF_2CF_2CF_2CF_2OCF_3$, $CF_2$=$CFOCF_2CF_2OCF_2CF_2CF_2CF_2CF_2OCF_3$, $CF_2$=$CFOCF_2CF_2(OCF_2)_3OCF_3$, $CF_2$=$CFOCF_2CF_2(OCF_2)_4OCF_3$, $CF_2$=$CFOCF_2CF_2OCF_2OCF_2OCF_3$, $CF_2$=$CFOCF_2CF_2OCF_2CF_2CF_3CF_2$=$CFOCF_2CF_2OCF_2CF_2OCF_2CF_2CF_3$, $CF_2$=$CFOCF_2CF(CF_3)$—O—$C_3F_7$ (PPVE-2), $CF_2$=$CF(OCF_2CF(CF_3))_2$—O—$C_3F_7$ (PPVE-3), and $CF_2$=$CF(OCF_2CF(CF_3))_3$—O—$C_3F_7$ (PPVE-4). In some embodiments, the perfluoroalkoxyalkyl vinyl ether is selected from $CF_2$=$CFOCF_2OCF_3$, $CF_2$=$CFOCF_2OCF_2CF_3$, $CF_2$=$CFOCF_2CF_2OCF_3$, $CF_2$=$CFOCF_2CF_2CF_2OCF_3$, $CF_2$=$CFOCF_2CF_2CF_2CF_2OCF_3$, $CF_2$=$CFOCF_2CF_2OCF_2CF_3$, $CF_2$=$CFOCF_2CF_2CF_2OCF_2CF_3$, $CF_2$=$CFOCF_2CF_2CF_2CF_2OCF_2CF_3$, $CF_2$=$CFOCF_2CF_2OCF_2OCF_3$, $CF_2$=$CFOCF_2CF_2OCF_2CF_2OCF_3$, $CF_2$=$CFOCF_2CF_2OCF_2CF_2CF_2OCF_3$, $CF_2$=$CFOCF_2CF_2OCF_2CF_2CF_2CF_2OCF_3$, $CF_2$=$CFOCF_2CF_2(OCF_2)_3OCF_3$, $CF_2$=$CFOCF_2CF_2(OCF_2)_4OCF_3$, $CF_2$=$CFOCF_2CF_2OCF_2OCF_2OCF_3$, and combinations thereof. Many of these perfluoroalkoxyalkyl vinyl ethers can be prepared according to the methods described in U.S. Pat. No. 6,255,536 (Worm et al.) and U.S. Pat. No. 6,294,627 (Worm et al.). In some embodiments, the PAOVE is other than perfluoro-3-methoxy-n-propyl vinyl ether.

The divalent units represented by formula

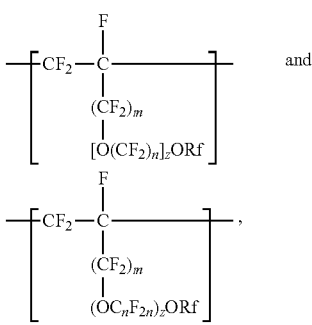

in which m is 1, are typically derived from at least one perfluoroalkoxyalkyl allyl ether. Suitable perfluoroalkoxyalkyl allyl ethers include those represented by formula $CF_2=CFCF_2(OC_aF_{2a})_zORf$, in which n, z, and Rf are as defined above in any of their embodiments. Examples of suitable perfluoroalkoxyalkyl allyl ethers include
$CF_2=CFCF_2OCF_2CF_2OCF_3$,
$CF_2=CFCF_2OCF_2CF_2CF_2OCF_3$,
$CF_2=CFCF_2OCF_2OCF_3$, $CF_2=CFCF_2OCF_2OCF_2CF_3$,
$CF_2=CFCF_2OCF_2CF_2CF_2CF_2OCF_3$,
$CF_2=CFCF_2OCF_2CF_2OCF_2CF_3$,
$CF_2=CFCF_2OCF_2CF_2CF_2OCF_2CF_3$,
$CF_2=CFCF_2OCF_2CF_2CF_2CF_2OCF_2CF_3$,
$CF_2=CFCF_2OCF_2CF_2OCF_2OCF_3$,
$CF_2=CFCF_2OCF_2CF_2OCF_2CF_2OCF_3$,
$CF_2=CFCF_2OCF_2CF_2OCF_2CF_2CF_2OCF_3$,
$CF_2=CFCF_2OCF_2CF_2OCF_2CF_2CF_2CF_2OCF_3$,
$CF_2=CFCF_2OCF_2CF_2OCF_2CF_2CF_2CF_2CF_2OCF_3$,
$CF_2=CFCF_2OCF_2CF_2(OCF_2)_3OCF_3$,
$CF_2=CFCF_2OCF_2CF_2(OCF_2)_4OCF_3$,
$CF_2=CFCF_2OCF_2CF_2OCF_2OCF_2OCF_3$,
$CF_2=CFCF_2OCF_2CF_2OCF_2CF_2CF_3$,
$CF_2=CFCF_2OCF_2CF_2OCF_2CF_2OCF_2CF_2CF_3$,
$CF_2=CFCF_2OCF(CF_3)-O-C_3F_7$, and $CF_2=CFCF_2(OCF_2CF(CF_3))_2-O-C_3F_7$. In some embodiments, the perfluoroalkoxyalkyl allyl ether is selected from
$CF_2=CFCF_2OCF_2CF_2OCF_3$,
$CF_2=CFCF_2OCF_2CF_2CF_2OCF_3$,
$CF_2=CFCF_2OCF_2OCF_3$, $CF_2=CFCF_2OCF_2OCF_2CF_3$,
$CF_2=CFCF_2OCF_2CF_2CF_2CF_2OCF_3$,
$CF_2=CFCF_2OCF_2CF_2OCF_2CF_3$,
$CF_2=CFCF_2OCF_2CF_2CF_2OCF_2CF_3$,
$CF_2=CFCF_2OCF_2CF_2CF_2CF_2OCF_2CF_3$,
$CF_2=CFCF_2OCF_2CF_2OCF_2OCF_3$,
$CF_2=CFCF_2OCF_2CF_2OCF_2CF_2OCF_3$,
$CF_2=CFCF_2OCF_2CF_2OCF_2CF_2CF_2OCF_3$,
$CF_2=CFCF_2OCF_2CF_2OCF_2CF_2CF_2CF_2OCF_3$,
$CF_2=CFCF_2OCF_2CF_2(OCF_2)_3OCF_3$,
$CF_2=CFCF_2OCF_2CF_2(OCF_2)_4OCF_3$,
$CF_2=CFCF_2OCF_2CF_2OCF_2OCF_2OCF_3$,
$CF_2=CFCF_2OCF_2CF_2OCF_2CF_2CF_3$,
$CF_2=CFCF_2OCF_2CF_2OCF_2CF_2OCF_2CF_2CF_3$, and combinations thereof.

Many of these perfluoroalkoxyalkyl allyl ethers can be prepared, for example, according to the methods described in U.S. Pat. No. 4,349,650 (Krespan). Perfluoroalkoxyalkyl allyl ethers can also be prepared by combining first components comprising at least one of $CF_2=CF-CF_2-OSO_2Cl$ or $CF_2=CF-CF_2-OSO_2CF_3$, a polyfluorinated compound comprising at least one ketone or carboxylic acid halide or combination thereof, and fluoride ion. Polyfluorinated compounds comprising at least one ketone or carboxylic acid halide or combination thereof and fluoride ions can be any of those described, for example, in U.S. Pat. No. 4,349,650 (Krespan).

$CF_2=CF-CF_2-OSO_2Cl$ can conveniently be prepared by reaction of boron trichloride ($BCl_3$) and $ClSO_3H$ to provide $B(OSO_2Cl)_3$ and subsequently reacting the $B(OSO_2Cl)_3$ and hexafluoropropylene (HFP). The reaction of $BCl_3$ and $ClSO_3H$ can be carried out, for example, by dropwise addition of neat $ClSO_3H$ to gaseous $BCl_3$ at below 50° C. or, in the case of condensed $BCl_3$ at sub-ambient temperature. The reaction can be carried out at a temperature of least –20° C., –10° C., 0° C., 10° C., or 20° C. and up to 30° C., 40° C., or 50° C. The addition of $ClSO_3H$ to $BCl_3$ can be carried out at a rate, for example, to maintain the temperature of the mixture at 10° C. or below. $B(OSO_2Cl)_3$ can be isolated as a white powder after volatile starting materials are removed under vacuum. $B(OSO_2Cl)_3$ can then be suspended or dissolved in a solvent, and HFP can be added at below 50° C., in some embodiments, at sub-ambient temperature. For example, the reaction can be carried out at a temperature of least –20° C., –10° C., 0° C., 10° C., or 20° C. and up to 30° C., 40° C., or 50° C. Suitable solvents include halogenated solvents (e.g., methylene chloride or Freon-113). In some embodiments, the solvent is a non-aromatic solvent. $CF_2=CF-CF_2-OSO_2Cl$ can be isolated and optionally purified using conventional methods.

Combining components comprising $M(OSO_2CF_3)_3$ and hexafluoropropylene (HFP) to provide $CF_2=CF-CF_2-OSO_2CF_3$, wherein M is Al or B. $Al(OSO_2CF_3)_3$ is commercially available, for example, from chemical suppliers such as abcr GmbH (Karlsruhe, Germany) and Sigma-Aldrich (St. Louis, Mo.). Reaction of $BCl_3$ and $CF_3SO_3H$ can be useful to provide $B(OSO_2CF_3)_3$. The reaction of $BCl_3$ and $CF_3SO_3H$ can be carried out, for example, by dropwise addition of neat $CF_3SO_3H$ to gaseous $BCl_3$ at below 50° C. or, in the case of condensed $BCl_3$ at sub-ambient temperature. The reaction can be carried out at a temperature of least –20° C., –10° C., 0° C., 10° C., or 20° C. and up to 30° C., 40° C., or 50° C. The addition of $CF_3SO_3H$ to $BCl_3$ can be carried out at a rate, for example, to maintain the temperature of the mixture at 10° C. or below. $B(OSO_2CF_3)_3$ can be isolated as a white powder after volatile starting materials are removed under vacuum.

$B(OSO_{b\ 2}CF_3)_3$ can combined with HFP at a temperature above 0° C. In some embodiments, the reaction can be carried out at a temperature up to 50° C., 40° C., 30° C., 20° C., or 10° C. The reaction can be carried out at a temperature in a range from above 0° C. to 10° C., in some embodiments, in a range from 2° C. to 10° C., and in some embodiments, in a range from 4° C. to 8° C. The reaction mixture is combined with water at a temperature below 28° C., in some embodiments, in a range from above 25° C. to 27° C. The reaction product can then be isolated and optionally purified using conventional methods (e.g., separation of the organic fraction, drying over a drying agent, filtering, and distilling). The product $CF_2=CF-CF_2-O-SO_2CF_3$ can be isolated in 75% yield, which is an improvement over the yield reported in Petrov, V. A., *J. Fluorine Chem.* 1995, 73, 17-19.

The vinyl ethers and allyl ethers described above in any of their embodiments, may be present in the components to be polymerized in any useful amount, in some embodiments, in an amount of up to 20, 15, 10, 7.5, or 5 mole percent, of at least 3, 4, 4.5, 5, or 7.5 mole percent, or in a range from 3 to 20, 4 to 20, 4.5 to 20, 5 to 20, 7.5 to 20, or 5 to 15 mole percent, based on the total amount of polymerizable components. Accordingly, the copolymer according to the present disclosure can include divalent units derived from these vinyl ethers and allyl ethers in any useful amount, in some embodiments, in an amount of up to 20, 15, 10, 7.5, or 5 mole percent, of at least 3, 4, 4.5, 5, or 7.5 mole percent, or in a range from 3 to 20, 4 to 20, 4.5 to 20, 5 to 20, 7.5 to 20, or 5 to 15 mole percent, based on the total moles of divalent units.

In some embodiments of the copolymer according to the present disclosure, the copolymer includes divalent units derived from at least one fluorinated olefin independently represented by formula $C(R)_2=CF-Rf_2$. These fluorinated divalent units are represented by formula $[CR_2-CFRf_2]-$. In formulas $C(R)_2=CF-Rf_2$ and $[CR_2-CFRf_2]-$, $Rf_2$ is fluorine or a perfluoroalkyl having from 1 to 8, in some embodiments 1 to 3, carbon atoms, and each R is independently hydrogen, fluorine, or chlorine. Some examples of fluorinated olefins useful as components of the polymerization include, hexafluoropropylene (HFP), trifluorochloroethylene (CTFE), and partially fluorinated olefins (e.g., vinylidene fluoride (VDF), tetrafluoropropylene (R1234yf), pentafluoropropylene, and trifluoroethylene). In some embodiments, the copolymer includes at least one of divalent units derived from chlorotrifluoroethylene or divalent units derived from hexafluoropropylene. Divalent units represented by formula —[$CR_2$—$CFRf_2$]— may be present in the copolymer in any useful amount, in some embodiments, in an amount of up to 10, 7.5, or 5 mole percent, based on the total moles of divalent units.

In some embodiments of the copolymer and method according to the present disclosure, the copolymer is essentially free of VDF units, and the components to be copolymerized are essentially free of VDF. For example, at a pH higher than 8, VDF may undergo dehydrofluorination, and it may be useful to exclude VDF from the components to be polymerized. "Essentially free of VDF" can mean that VDF is present in the components to be polymerized at less than 1 (in some embodiments, less than 0.5, 0.1, 0.05, or 0.01) mole percent. "Essentially free of VDF" includes being free of VDF.

Copolymers of the present disclosure can comprise divalent units independently represented by formula:

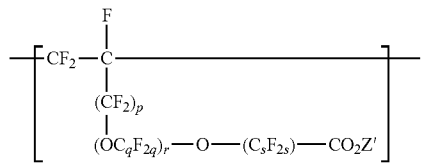

wherein p is 0 or 1, q is 2 to 8, r is 0 to 2, s is 1 to 8, and Z' is a hydrogen, an alkali-metal cation or a quaternary ammonium cation. In some embodiments, q is a number from 2 to 6 or 2 to 4. In some embodiments, q is 2. In some embodiments, s is a number from 1 to 6 or 2 to 4. In some embodiments, s is 2. In some embodiments, s is 4. In some embodiments, r is 0 or 1. In some embodiments, r is 0. In some embodiments, r is 0, and s is 2 or 4. In some embodiments, q is 3, r is 1, and e is 2. $C_sF_{2s}$, may be linear or branched. In some embodiments, $C_sF_{2s}$ can be written as $(CF_2)_s$, which refers to a linear perfluoroalkylene group. When r is 2, the q in the two $C_qF_{2q}$ groups may be independently selected. However, within a $C_qF_{2q}$ group, a person skilled in the art would understand that q is not independently selected. Each Z' is independently a hydrogen, an alkali metal cation, or a quaternary ammonium cation. The quaternary ammonium cation can be substituted with any combination of hydrogen and alkyl groups, in some embodiments, alkyl groups independently having from one to four carbon atoms. In some embodiments, Z' is an alkali-metal cation. In some embodiments, Z' is a sodium or lithium cation. In some embodiments, Z' is a sodium cation. Divalent units represented by formula

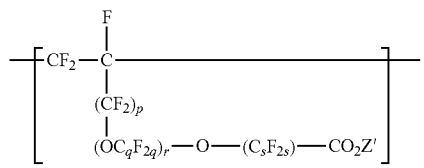

may be present in the copolymer in any useful amount, in some embodiments, in an amount of up to 10, 7.5, or 5 mole percent, based on the total moles of divalent units.

Copolymers of the present disclosure can also include units derived from bisolefins represented by formula $X_2C$=$CY$—$(CW_2)_m$—$(O)_n$—$R_F$—$(O)_o$—$(CW_2)_p$—$CY$=$CX_2$. In this formula, each of X, Y, and W is independently fluoro, hydrogen, alkyl, alkoxy, polyoxyalkyl, perfluoroalkyl, perfluoroalkoxy or perfluoropolyoxyalkyl, m and p are independently an integer from 0 to 15, and n, o are independently 0 or 1. In some embodiments, X, Y, and W are each independently fluoro, $CF_3$, $C_2F_5$, $C_3F_7$, $C_4F_9$, hydrogen, $CH_3$, $C_2H_5$, $C_3H_7$, $C_4H_9$. In some embodiments, X, Y, and W are each fluoro (e.g., as in $CF_2$=$CF$—$O$—$RF$—$O$—$CF$=$CF_2$ and $CF_2$=$CF$—$CF_2$—$O$—$R_F$—$O$—$CF_2$—$CF$=$CF_2$). In some embodiments, n and o are 1, and the bisolefins are divinyl ethers, diallyl ethers, or vinyl-allyl ethers. $R_F$ represents linear or branched perfluoroalkylene or perfluoropolyoxyalkylene or arylene, which may be non-fluorinated or fluorinated. In some embodiments, $R_F$ is perfluoroalkylene having from 1 to 12, from 2 to 10, or from 3 to 8 carbon atoms. The arylene may have from 5 to 14, 5 to 12, or 6 to 10 carbon atoms and may be non-substituted or substituted with one or more halogens other than fluoro, perfluoroalkyl (e.g. —$CF_3$ and —$CF_2CF_3$), perfluoroalkoxy (e.g. —$O$—$CF_3$, —$OCF_2CF_3$), perfluoropolyoxyalkyl (e.g., —$OCF_2OCF_3$; —$CF_2OCF_2OCF_3$), fluorinated, perfluorinated, or non-fluorinated phenyl or phenoxy, which may be substituted with one or more perfluoroalkyl, perfluoroalkoxy, perfluoropolyoxyalkyl groups, one or more halogens other than fluoro, or combinations thereof. In some embodiments, $R_F$ is phenylene or mono-, di-, tri- or tetrafluorophenylene, with the ether groups linked in the ortho, para or meta position. In some embodiments, $R_F$ is $CF_2$; $(CF_2)_q$ wherein q is 2, 3, 4, 5, 6, 7 or 8; $CF_2$—$O$—$CF_2$; $CF_2$—$O$—$CF_2$—$CF_2$; $CF(CF_3)CF_2$; $(CF_2)_2$—$O$—$CF(CF_3)$—$CF_2$; $CF(CF_3)$—$CF_2$—$O$—$CF(CF_3)CF_2$; or $(CF_2)_2$—$O$—$CF(CF_3)$—$CF_2$—$O$—$CF(CF_3)$—$CF_2$—$O$—$CF_2$. The bisolefins can introduce long chain branches as described in U.S. Pat. Appl. Pub. No. 2010/0311906 (Lavallée et al.). The bisolefins, described above in any of their embodiments, may be present in the components to be polymerized in any useful amount, in some embodiments, in an amount of up to 2, 1, or 0.5 mole percent and in an amount of at least 0.1 mole percent, based on the total amount of polymerizable components.

Copolymers of the present disclosure can also include units derived from non-fluorinated monomers. Examples of suitable non-fluorinated monomers include ethylene, propylene, isobutylene, ethyl vinyl ether, vinyl benzoate, ethyl allyl ether, cyclohexyl allyl ether, norbornadiene, crotonic acid, an alkyl crotonate, acrylic acid, an alkyl acrylate, methacrylic acid, an alkyl methacrylate, and hydroxybutyl vinyl ether. Any combination of these non-fluorinated monomers may be useful. In some embodiments, the components to be polymerized further include acrylic acid or methacrylic acid, and the copolymer of the present disclosure includes units derived from acrylic acid or methacrylic acid.

Typically, the copolymer of the present disclosure does not include cyclic structures comprising fluorinated carbon atoms and oxygen atoms in the main chain (that is, divalent units comprising such cyclic structures).

In some embodiments, the copolymer according to the present disclosure can be made from the sulfonyl fluoride compounds, where X" in any of the aforementioned compounds represented by formula $CF_2$=$CF(CF_2)_a$—$(OC_bF_{2b})_c$—$O$—$(C_eF_{2e})$—$SO_2X$" is F, according to the methods described below, for example. In these embodiments, the —SO$_2$F groups may be hydrolyzed or treated with ammonia using conventional methods to provide —SO$_3$Z or —SO$_2$NZH groups. Hydrolysis of a copolymer having —SO$_2$F groups with an alkaline hydroxide (e.g. LiOH, NaOH, or KOH) solution provides —SO$_3$Z groups, which may be subsequently acidified to SO$_3$H groups. Treatment of a copolymer having —SO$_2$F groups with water and steam can form SO$_3$H groups. Thus, copolymers of the present disclosure having —SO$_2$F groups (that is, in which X is F) are useful intermediates for making other copolymers of the present disclosure.

In some embodiments, the method according to the present disclosure includes copolymerizing components including at least one compound represented by formula CF$_2$=CF (CF$_2$)$_a$—(OC$_b$F$_{2b}$)$_c$—O—(C$_e$F$_{2e}$)—SO$_2$X', in which b, c, and e are as defined above in any of their embodiments. In this formula, X' is —NZ'H or —OZ', wherein each Z' is independently a hydrogen, an alkali metal cation, or a quaternary ammonium cation. The quaternary ammonium cation can be substituted with any combination of hydrogen and alkyl groups, in some embodiments, alkyl groups independently having from one to four carbon atoms. In some embodiments, Z' is an alkali-metal cation. In some embodiments, Z' is a sodium or lithium cation. In some embodiments, Z' is a sodium cation. In some embodiments, the compound represented by formula CF$_2$=CF(CF$_2$)$_a$—(OC$_b$F$_{2b}$)$_c$—O—(C$_e$F$_{2e}$)—SO$_2$X' is CF$_2$=CFCF$_2$—O—CF$_2$CF$_2$—SO$_3$Na.

The copolymer according to the present disclosure can have an —SO$_2$X equivalent weight of up to 2000, 1900, 1800, 1750, 1500, 1400, 1300, 1200, 1100, 1000, 900, 800, 750, 700, or 600. In some embodiments, the copolymer has an —SO$_2$X equivalent weight of at least 300, 400, 500, 600, 700, 800, 900, 950, or 1000. In some embodiments, the copolymer or ionomer has an —SO$_2$X equivalent weight in a range from 800 to 2000, 950 to 2000, or 1000 to 2000. In some embodiments, the copolymer has an —SO$_3$Z equivalent weight in a range from 300 to 1400, 300 to 1300, 300 to 1200, 400 to 1200, or 400 to 1000. In general, the S02X equivalent weight of the copolymer refers to the weight of the copolymer containing one mole of —SO$_2$X groups, wherein X is as defined above in any of its embodiments. In some embodiments, the —SO$_2$X equivalent weight of the copolymer refers to the weight of the copolymer that will neutralize one equivalent of base. In some embodiments, the —SO$_2$X equivalent weight of the copolymer refers to the weight of the copolymer containing one mole of sulfonate groups (i.e., —SO$_3^-$). Decreasing the —SO$_2$X equivalent weight of the copolymer or ionomer tends to increase proton conductivity in the copolymer or ionomer but tends to decrease its crystallinity, which may compromise the mechanical properties of the copolymer. Thus, the —SO$_2$X equivalent weight may be selected based on a balance of the requirements for the electrical and mechanical properties of the copolymer or ionomer. In some embodiments, the —SO$_2$X equivalent weight of the copolymer refers to the weight of the copolymer containing one mole of sulfonamide groups (i.e., —SO$_2$NH). Sulfonimide groups (e.g., when X is —NZSO$_2$(CF$_2$)$_{1-6}$SO$_2$X' and —NZ[SO$_2$(CF$_2$)$_a$SO$_2$NZ]$_{1-10}$SO$_2$(CF$_2$)$_a$SO$_2$X') also function as acid groups that can neutralize base as described in further detail below. The effect equivalent weight of copolymers including these groups can be much lower than 1000. Equivalent weight can be calculated from the molar ratio of monomer units in the copolymer using, for example, the equation shown in the Examples, below.

The copolymer according to the present disclosure can have up to 30 mole percent of divalent units independently represented by formula

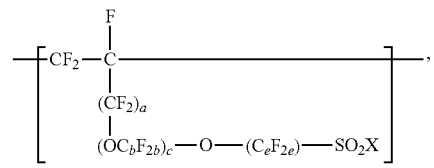

based on the total amount of the divalent units. In some embodiments, the copolymer comprises up to 25 or 20 mole percent of these divalent units, based on the total amount of these divalent units. The components that are copolymerized in the methods described herein can comprise up to 30 mole percent of at least one compound represented by formula CF$_2$=CF(CF$_2$)$_a$—(OC$_b$F$_{2b}$)$_c$—O—(C$_e$F$_{2e}$)—SO$_2$X or CF$_2$CF(CF$_2$)$_a$—(OC$_b$F$_{2b}$)$_c$—O—(C$_e$F$_{2e}$)—SO$_2$X', in any of their embodiments described above, based on the total amount of components. In some embodiments, the components comprise up to 25 or 20 mole percent of a compound represented by formula CF$_2$=CF(CF$_2$)$_a$—(OC$_b$F$_{2b}$)$_c$—O—(C$_e$F$_{2e}$)—SO$_2$X" or CF$_2$=CF(CF$_2$)$_a$—(OC$_b$F$_{2b}$)$_c$—O—(C$_e$F$_{2e}$)—SO$_2$X', based on the total amount of components.

The molecular weights of copolymers according to the present disclosure can be characterized by the melt viscosity or the melt flow index (MFI, e.g., 265° C./5 kg) of a variation of the copolymer in which X is F. In some embodiments, the copolymer of the present disclosure has an MFI of up to 80 grams per 10 minutes, 70 grams per 10 minutes, 60 grams per 10 minutes, 50 grams per 10 minutes, 40 grams per 10 minutes, 30 grams per 10 minutes, or 20 grams per 10 minutes. In some embodiments, the copolymer according to the present disclosure has an MFI of up to 15 grams per 10 minutes or up to 12 grams per 10 minutes. When the MFI is up to 80, 70, 60, 50, 40, 30, 20, 15, or 12 grams per 10 minutes, good mechanical properties are achieved. The MFI of a copolymer can be affected by adjusting the amount of the initiator and/or chain-transfer agent used during polymerization, both of which affect the molecular weight and molecular-weight distribution of the copolymer. MFI can also be controlled by the rate of addition of initiator to the polymerization. Variations in the monomer composition can also affect the MFI. For the purposes of the present disclosure, MFI is measured according to the test method described in the Examples, below. It should be noted that an MFI of about 20 grams per 10 minutes measured at 270° C./2.16 kg will give an MFI of 43 grams per 10 minutes measured at 265° C./5 kg. In general, when an MFI is measured at 265° C./5 kg, a value of more than twice than an MFI measured at 270° C./2.16 kg is obtained.

In some embodiments, copolymers of the present disclosure are ionomers (e.g., when X is other than F). Ionomers typically exhibit a thermal transition between a state in which the ionic clusters are closely associated and a state in which the interactions between those clusters have been weakened. This transition is described as an alpha transition, and the transition temperature is T(α). Ionomers with higher T(α) typically have greater mechanical integrity at elevated temperatures than corresponding materials with lower T(α). As a result, to obtain high service temperatures for an ionomer, a relatively high T(α) can be desirable for ionomers. In some embodiments, the α-dispersion temperature T(α) of copolymers of the present disclosure is at least 95° C., 100° C., 105° C., 110° C., or 115° C. However, we have found that decreasing the T(α) can increase oxygen permeability and that selecting a T(α) to obtain a balance of mechanical integrity and oxygen permeability can be useful. In some embodiments, the a-dispersion temperature [T(α)] of copolymer of the present disclosure is up to 110° C., 105° C., or 100° C., or less than 100° C., in some embodiments, up to 99.5° C. or 99° C. In some embodiments, the α-dispersion temperature [T(α)] of copolymer of the present disclosure is at least room temperature (e.g., 25° C.), in some embodiments, at least 60° C., 65° C., 70° C., 75° C., 80° C., 85° C., 90° C., or 95° C. In some embodiments, the α-dispersion temperature [T(α)] of copolymer of the present disclosure is in a range from 60° C. to 100° C., 70° C. to 100° C., 80° C. to 100° C., 90° C. to 100° C., or 95° C. to 100° C. In some embodiments, the α-dispersion temperature [T(α)] of copolymer of the present disclosure is in a range from 60° C. to 99.5° C., 70° C. to 99.5° C., 80° C. to 99.5° C., 90° C. to 99.5° C., or 95° C. to 99.5° C. In some embodiments, the α-dispersion temperature [T(α)] of copolymer of the present disclosure is in a range from 60° C. to 70° C. to 99° C., 80° C. to 99° C., 90° C. to 99° C. or 95° C. to 99° C. In the copolymers of the present disclosure, various factors can affect the [T(α)]. For example, when a, b, c, and e are selected to provide greater than 2, at least 3, or at least 4 carbon atoms in the side chain of the sulfonyl-substituted divalent units a T(α) up to 100° C. (e.g., in a range from 80° C. to 100° C., 90° C. to 100° C., or 95° C. to 100° C.) may be achieved. Also, when m, m', n, z, Rf, and Rf$_1$ are selected to provide greater than 2, at least 3, or at least 4 carbon atoms and/or at least one or 2 oxygen atoms in the side chain of the divalent units represented by formula

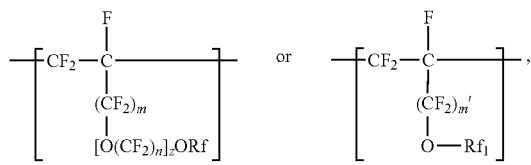

a T(α) up to 100° C. (e.g., in a range from 80° C. to 100° C., 90° C. to 100° C., or 95° C. to 100° C.) may be achieved. Including more than 3, 4, 4.5, 5, or 7.5 mol percent of these divalent units can be useful for achieving a T(α) in these ranges. Also, the cation present in the ionomer affects the T(α). Thus, T(α) in the copolymer of the present disclosure can be changed, for example, by ion exchange.

Dynamic mechanical analysis (DMA) is a useful tool for measuring T(α), as polymer physical property changes accompany this transition. The DMA sample cell may be set up in torsion, compression, or tension. For the purposes of this disclosure, T(α) is measured by the method described in the Examples, below. Since the T(α) changes with different cations, for the purposes of this disclosure, the T(α) is understood to be the T(α) when Z is hydrogen.

The glass transition temperature (Tg) is typically defined as the temperature at which an amorphous polymer or amorphous region within a polymer transitions from a glassy material (below Tg) to a rubbery one (above Tg). Gas diffusion rates are correlated to free volume in a polymer [see, for example, Diffusion in Polymers, Marcel Dekker (New York), 1996, edited by P. Neogi]. The free volume increases with temperature, particularly so above the Tg of the polymer. The molecular transport of a gas is enhanced the more the temperature of operation exceeds the Tg of the polymer. As a result, polymers having a relatively low Tg can be desirable for applications in which gas diffusion is required. In some embodiments, in the copolymers of the present disclosure, a, b, c, and e may be selected to provide greater than 2, at least 3, or at least 4 carbon atoms in the side chain of the sulfonyl-substituted divalent units to achieve a lower Tg. In some embodiments, the copolymer in which X is F has a Tg less than 30° C., less than room temperature, or up to 25° C., 20° C., 15° C., or 10° C. Since multiple bulk physical properties of the polymer are different in the glassy state relative to the rubbery state, a variety of methods can be used to measure the Tg. Differential scanning calorimetry (DSC) and dilatometry detect changes in the heat capacity and thermal expansion of the polymer in the two states, while methods such as thermal mechanical analysis (TMA) and dynamic mechanic analysis (DMA) detect differences in the physical properties in the two states. For the purposes of this disclosure, Tg is measured by the method described in the Examples, below.

In some embodiments, the copolymer of the present disclosure has at least one of a relative high T(α) (e.g., at least 100° C., 105° C., 110° C., 115° C., 120° C., or 125° C.) or a relative low Tg (e.g., up to 25° C., 20° C., 15° C., or 10° C.). In some embodiments, the copolymer of the present disclosure has at least one of a relative low T(α) (e.g., up to 110° C., 105° C., or 100° C.) or a relative low Tg (e.g., up to 25° C., 20° C., 15° C., or 10° C.). In some embodiments, the copolymer of the present disclosure has both a relative high T(α) (e.g., at least 100° C., 105° C., 110° C., 115° C., 120° C., or 125° C.) and a relative low Tg (e.g., up to 25° C., 20° C., 15° C., or 10° C.). In some embodiments, the copolymer of the present disclosure has both a relative low T(α) (e.g., up to 110° C., 105° C., or 100° C.) and a relative low Tg (e.g., up to 25° C., 20° C., 15° C., or 10° C.).

High oxygen permeability in the copolymers disclosed herein can be useful to improve the efficiency of fuel cells, for example. Copolymers of the present disclosure typically have useful oxygen permeabilities for fuel cell applications. Oxygen permeability can be measured by methods known in the art including the time lag method described in the Examples, below. As shown in a comparison of Example 1 and Comparative Example A in the Examples below, the addition of the divalent unit represented by formula

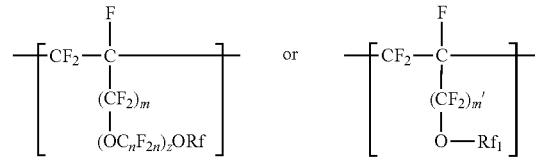

can quadruple the oxygen permeability of a copolymer in comparison to a comparable copolymer that does not include these units. Comparable can mean similar to the copolymer of the present disclosure in equivalent weight. The addition of the divalent unit represented by formula

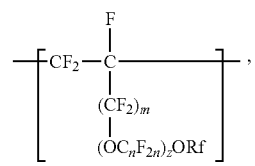

in which m, n, z, and Rf are as defined above, unexpectedly can increase the oxygen permeability of a copolymer by an order of magnitude in comparison to a comparable copolymer that does not include these units. Furthermore, as shown in a comparison of Example 1 and Illustrative Example 3, the addition of the divalent unit represented by formula

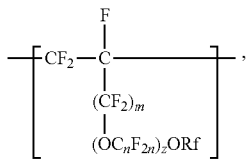

in which m, n, z, and Rf are as defined above, can increase the oxygen permeability of a copolymer by an unexpectedly greater amount in comparison to a comparable copolymer that includes divalent units derived from $CF_2$=CF—O—$(CF_2)_2$—$CF_3$ instead of the divalent unit represented by formula

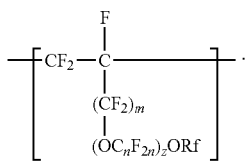

In some embodiments, including embodiments in which a lower equivalent weight is desired, the copolymer may be crosslinked to improve, for example, its durability. One useful method of crosslinking is e-beam crosslinking a copolymer that includes chloro, bromo, or iodo groups as described in U.S. Pat. No. 7,265,162 (Yandrasits et al.). Incorporating chloro, bromo, or iodo groups, in some embodiments, bromo or iodo groups, into the copolymer prepared by the method disclosed herein can be carried out by including compounds having formula $CX_2$=CX(Q) in the components to be polymerized. In formula $CX_2$=CX (Q), each X is independently H or F, and W is I, Br, or $R_f$-Q, wherein Q is I or Br and RF is a perfluorinated or partially perfluorinated alkylene group optionally containing O atoms. Examples of useful monomers of formula $CX_2$=CX (Q) include $CF_2$=CHI, $CF_2$=CFI, $CF_2$=CFCF$_2$I, $CF_2$=CFCF$_2$CF$_2$I, $CF_2$=CFOCF$_2$CF$_2$I, $CF_2$=CFOCF$_2$CF$_2$CF$_2$I, $CF_2$=CFOCF$_2$CF$_2$CF$_2$CF$_2$I, $CF_2$=CFO(CF$_2$)$_3$OCF$_2$CF$_2$I, $CF_2$=CHBr, $CF_2$=CFBr, $CF_2$=CFCF$_2$Br, $CF_2$=CFOCF$_2$CF$_2$Br, $CF_2$=CFCl, $CF_2$=CFCF$_2$Cl, or a mixture thereof. E-beam crosslinking may be carried out on the copolymer, for example, after it is formed into a membrane as described below.

The methods of making the copolymer can be carried out by free-radical polymerization. Conveniently, in some embodiments, the methods of making the copolymer disclosed herein includes radical aqueous emulsion polymerization.

In some embodiments of the methods of making the copolymer according to the present disclosure, a water-soluble initiator (e.g., potassium permanganate or a peroxy sulfuric acid salt) can be useful to start the polymerization process. Salts of peroxy sulfuric acid, such as ammonium persulfate or potassium persulfate, can be applied either alone or in the presence of a reducing agent, such as bisulfites or sulfinates (e.g., fluorinated sulfinates disclosed in U.S. Pat. Nos. 5,285,002 and 5,378,782, both to Grootaert) or the sodium salt of hydroxy methane sulfinic acid (sold under the trade designation "RONGALIT", BASF Chemical Company, New Jersey, USA). The choice of initiator and reducing agent, if present, will affect the end groups of the copolymer. The concentration range for the initiators and reducing agent can vary from 0.001% to 5% by weight based on the aqueous polymerization medium.

In some embodiments of the method of making the copolymer, —$SO_2X$ end groups are introduced in the copolymers according to the present disclosure by generating $SO_3^-$ radicals during the polymerization process. When salts of peroxy sulfuric acid are used in the presence of a sulfite or bisulfite salt (e.g., sodium sulfite or potassium sulfite), $SO_3^-$ radicals are generated during the polymerization process, resulting in —$SO_3^-$ end groups. It might be useful to add metal ions to catalyze or accelerate the formation of —$SO_3^-$ radicals. By altering the stoichiometry of the sulfite or bisulfite salt versus the peroxy sulfuric acid salt, one can vary the amount of —$SO_2X$ end groups.

Most of the initiators described above and any emulsifiers that may be used in the polymerization have an optimum pH-range where they show most efficiency. Also, a pH can be selected for the method according to the present disclosure such that the polymerization is carried out with the salt form of the compound of formula $CF_2$=$CF(CF_2)_a$—$(OC_bF_{2b})_c$—O—$(C_eF_{2e})$—$SO_2X'$, wherein X' is an alkali metal cation or an ammonium cation, and to maintain the salt form of the copolymer. For these reason, buffers may be useful. Buffers include phosphate, acetate, or carbonate (e.g., $(NH_4)_2CO_3$ or $NaHCO_3$) buffers or any other acid or base, such as ammonia or alkali-metal hydroxides. In some embodiments, the copolymerizing is carried out at a pH of at least 8, higher than 8, at least 8.5, or at least 9. The concentration range for the initiators and buffers can vary from 0.01% to 5% by weight based on the aqueous polymerization medium. In some embodiments, ammonia is added to the reaction mixture in an amount to adjust the pH to at least 8, higher than 8, at least 8.5, or at least 9.

Typical chain-transfer agents like $H_2$, lower alkanes, alcohols, ethers, esters, and $CH_2Cl_2$ may be useful in the preparation of the copolymer and ionomer according to the present disclosure. Termination primarily via chain-transfer results in a polydispersity of about 2.5 or less. In some embodiments of the method according to the present disclosure, the polymerization is carried out without any chain-transfer agents. A lower polydispersity can sometimes be achieved in the absence of chain-transfer agents. Recombination typically leads to a polydispersity of about 1.5 for small conversions.

Useful polymerization temperatures can range from 20° C. to 150° C. Typically, polymerization is carried out in a temperature range from 30° C. to 120° C., 40° C. to 100° C., or 50° C. to 90° C. The polymerization pressure is usually in the range of 0.4 MPa to 2.5 MPa, 0.6 to 1.8 MPa, 0.8 MPa to 1.5 MPa, and in some embodiments is in the range from 1.0 MPa to 2.0 MPa. Fluorinated monomers such as HFP can be precharged and fed into the reactor as described, for example, in *Modern Fluoropolymers*, ed. John Scheirs, Wiley & Sons, 1997, p. 241. Perfluoroalkoxyalkyl vinyl ethers represented by formula $CF_2$=$CF(OC_nF_{2n})_zORf$ and perfluoroalkoxyalkyl allyl ethers represented by formula $CF_2$=$CFCF_2(OC_nF_{2n})_zORf$, wherein n, z, and Rf are as defined above in any of their embodiments, are typically liquids and may be sprayed into the reactor or added directly, vaporized, or atomized.

Conveniently, in some embodiments of the method of making the copolymer according to the present disclosure, the polymerization process may be conducted with no emulsifier (e.g., no fluorinated emulsifier). Surprisingly, we have found that even with the incorporation of liquid perfluoroalkoxyalkyl vinyl or perfluoroalkoxyalkyl allyl ethers or bisolefins in larger amounts, no fluorinated emulsifier is needed to ensure proper incorporation of these monomers. It can be useful to feed the compound represented by formula $CF_2=CF(CF_2)_a—(OC_bF_{2b})_c—O—(C_eF_{2e})—SO_2X''$ and the non-functional comonomers (e.g., perfluoroalkoxyalkyl vinyl or perfluoroalkoxyalkyl allyl ethers or bisolefins) as a homogenous mixture to the polymerization. In some embodiments, it is possible to hydrolyze some of the $CF_2=CF(CF_2)_a—(OC_bF_{2b})_c—O—(C_eF_{2e})—SO_2F$ (e.g., up to 5 ppm) to obtain an "in situ"-emulsifier. Advantageously, this method may be conducted in the absence of any other fluorinated emulsifiers.

In some embodiments, however, perfluorinated or partially fluorinated emulsifiers may be useful. Generally these fluorinated emulsifiers are present in a range from about 0.02% to about 3% by weight with respect to the polymer. Polymer particles produced with a fluorinated emulsifier typically have an average diameter, as determined by dynamic light scattering techniques, in range of about 10 nanometers (nm) to about 500 nm, and in some embodiments in range of about 50 nm to about 300 nm. Examples of suitable emulsifiers include perfluorinated and partially fluorinated emulsifier having the formula $[R_f—O-L-COO^-]_iX^{i+}$ wherein L represents a linear partially or fully fluorinated alkylene group or an aliphatic hydrocarbon group, $R_f$ represents a linear partially or fully fluorinated aliphatic group or a linear partially or fully fluorinated aliphatic group interrupted with one or more oxygen atoms, $X^{i+}$ represents a cation having the valence i and i is 1, 2 or 3. (See, e.g., U.S. Pat. No. 7,671,112 to Hintzer et al.). Additional examples of suitable emulsifiers also include perfluorinated polyether emulsifiers having the formula $CF_3—(OCF_2)_x—O—CF_2—X'$, wherein x has a value of 1 to 6 and X' represents a carboxylic acid group or salt thereof, and the formula $CF_3—O—(CF_2)_3—(OCF(CF_3)—CF_2)_y—O—L-Y'$ wherein y has a value of 0, 1, 2 or 3, L represents a divalent linking group selected from —$CF(CF_3)$—, —$CF_2$—, and —$CF_2CF_2$—, and Y' represents a carboxylic acid group or salt thereof (See, e.g., U.S. Pat. Publ. No. 2007/0015865 to Hintzer et al.). Other suitable emulsifiers include perfluorinated polyether emulsifiers having the formula $R_f—O(CF_2CF_2O)CF_2COOA$ wherein $R_f$ is $C_bF_{(2b+i)}$; where b is 1 to 4, A is a hydrogen atom, an alkali metal or $NH_4$, and x is an integer of from 1 to 3. (See, e.g., U.S. Pat. Publ. No. 2006/0199898 to Funaki et al.). Suitable emulsifiers also include perfluorinated emulsifiers having the formula $F(CF_2)_bO(CF_2CF_2O)_xCF_2COOA$ wherein A is a hydrogen atom, an alkali metal or $NH_4$, b is an integer of from 3 to 10, and x is 0 or an integer of from 1 to 3. (See, e.g., U.S. Pat. Publ. No. 2007/0117915 to Funaki et al.). Further suitable emulsifiers include fluorinated polyether emulsifiers as described in U.S. Pat. No. 6,429,258 to Morgan et al. and perfluorinated or partially fluorinated alkoxy acids and salts thereof wherein the perfluoroalkyl component of the perfluoroalkoxy has 4 to 12 carbon atoms, or 7 to 12 carbon atoms. (See, e.g., U.S. Pat. No. 4,621,116 to Morgan). Suitable emulsifiers also include partially fluorinated polyether emulsifiers having the formula $[R_f—(O)_t—CHF—(CF_2)_x—COO—]_iX^{i+}$ wherein $R_f$ represents a partially or fully fluorinated aliphatic group optionally interrupted with one or more oxygen atoms, t is 0 or 1 and x is 0 or 1, $X^{i+}$ represents a cation having a valence i and i is 1, 2 or 3. (See, e.g., U.S. Pat. Publ. No. 2007/0142541 to Hintzer et al.). Further suitable emulsifiers include perfluorinated or partially fluorinated ether-containing emulsifiers as described in U.S. Pat. Publ. Nos. 2006/0223924, 2007/0060699, and 2007/0142513 each to Tsuda et al. and 2006/0281946 to Morita et al. Fluoroalkyl, for example, perfluoroalkyl carboxylic acids and salts thereof having 6-20 carbon atoms, such as ammonium perfluorooctanoate (APFO) and ammonium perfluorononanoate (see, e.g., U.S. Pat. No. 2,559,752 to Berry) may also be useful. Conveniently, in some embodiments, the method of making the copolymer according to the present disclosure may be conducted in the absence of any of these emulsifiers or any combination thereof.

If fluorinated emulsifiers are used, the emulsifiers can be removed or recycled from the fluoropolymer latex, if desired, as described in U.S. Pat. No. 5,442,097 to Obermeier et al., U.S. Pat. No. 6,613,941 to Felix et al., U.S. Pat. No. 6,794,550 to Hintzer et al., U.S. Pat. No. 6,706,193 to Burkard et al., and U.S. Pat. No. 7,018,541 to Hintzer et al.

In some embodiments, the obtained copolymer latices are purified by at least one of anion- or cation-exchange processes to remove functional comonomers, anions, and/or cations before coagulation or spray drying (described below). As used herein, the term "purify" refers to at least partially removing impurities, regardless of whether the removal is complete. Anionic species that may constitute impurities include, for example, fluoride, anionic residues from surfactants and emulsifiers (e.g., perfluorooctanoate), and residual compounds represented by formula $CF_2=CF(CF_2)_a—(OC_bF_{2b})_c—O—(C_eF_{2e})—SO_2X'$. It should be noted, however, that it may be desirable to not remove ionic fluoropolymer from the dispersion. Useful anion exchange resins typically comprise a polymer (typically crosslinked) that has a plurality of cationic groups (e.g., quaternary alkyl ammonium groups) paired with various anions (e.g., halide or hydroxide). Upon contact with the fluoropolymer dispersion, anionic impurities in the dispersion become associated with the anion exchange resin. After the anion exchange step, the resultant anion-exchanged dispersion is separated from the anion exchange resin, for example, by filtration. It was reported in U.S. Pat. No. 7,304,101 (Hintzer et al.) that the anionic hydrolyzed fluoropolymer does not appreciably become immobilized on the anion exchange resin, which would lead to coagulation and/or material loss. Anionic exchange resins are available commercially from a variety of sources. If the anion exchange resin is not in the hydroxide form it may be at least partially or fully converted to the hydroxide salt form before use. This is typically done by treating the anion exchange resin with an aqueous ammonia or sodium hydroxide solution. Typically, better yields are obtained using gel-type anion-exchange resins than with macroporous anion exchange resins.

Examples of cationic impurities resulting from the above-mentioned polymerization include one or more of, alkali metal cation(s) (e.g., $Li^+$, $Na^+$, $K^+$), ammonium, quaternary alkyl ammonium, alkaline earth cations (e.g., $Mg^{2+}$, $Ca^{2+}$), manganese cations (e.g. $Mn^{2+}$), and Group III metal cations. Useful cation exchange resins include polymers (typically cross-linked) that have a plurality of pendant anionic or acidic groups such as, for example, polysulfonates or polysulfonic acids, polycarboxylates or polycarboxylic acids. Examples of useful sulfonic acid cation exchange resins include sulfonated styrene-divinylbenzene copolymers, sulfonated crosslinked styrene polymers, phenol-formaldehyde-sulfonic acid resins, and benzene-formaldehyde-sulfonic acid resins. Carboxylic acid cation exchange resin is an organic acid, cation exchange resin, such as carboxylic acid cation exchange resin. Cation exchange resins are available commercially from a variety of sources. Cation exchange resins are commonly supplied commercially in either their acid or their sodium form. If the cation exchange resin is not in the acid form (i.e., protonated form) it may be at least partially or fully converted to the acid form in order to avoid the generally undesired introduction of other cations into the dispersion. This conversion to the acid form may be accomplished by means well known in the art, for example by treatment with any adequately strong acid.

If purification of the fluoropolymer dispersion is carried out using both anion and cation exchange processes, the anion exchange resin and cation exchange resin may be used individually or in combination as, for example, in the case of a mixed resin bed having both anion and cation exchange resins.

To coagulate the obtained copolymer latex, any coagulant which is commonly used for coagulation of a fluoropolymer latex may be used, and it may, for example, be a water-soluble salt (e.g., calcium chloride, magnesium chloride, aluminum chloride or aluminum nitrate), an acid (e.g., nitric acid, hydrochloric acid or sulfuric acid), or a water-soluble organic liquid (e.g., alcohol or acetone). The amount of the coagulant to be added may be in a range of 0.001 to 20 parts by mass, for example, in a range of 0.01 to 10 parts by mass per 100 parts by mass of the latex. Alternatively or additionally, the latex may be frozen for coagulation or mechanically coagulated, for example, with a homogenizer as described in U.S. Pat. No. 5,463,021 (Beyer et al.). Alternatively or additionally, the latex may be coagulated by adding polycations. It may also be useful to avoid acids and alkaline earth metal salts as coagulants to avoid metal contaminants. To avoid coagulation altogether and any contaminants from coagulants, spray drying the latex after polymerization and optional ion-exchange purification may be useful to provide solid copolymer.

A coagulated copolymer can be collected by filtration and washed with water. The washing water may, for example, be ion-exchanged water, pure water, or ultrapure water. The amount of the washing water may be from 1 to 5 times by mass to the copolymer or ionomer, whereby the amount of the emulsifier attached to the copolymer can be sufficiently reduced by one washing.

The copolymer produced can have less than 50 ppm metal ion content, in some embodiments, less than 25 ppm, less than 10 ppm, less than 5 ppm, or less than 1 ppm metal ion content. Specifically, metal ions such as alkali metals, alkaline earth metal, heavy metals (e.g., nickel, cobalt, manganese, cadmium, and iron) can be reduced. To achieve a metal ion content of less than 50 ppm, 25 ppm, 10 ppm, 5 ppm, or 1 ppm, polymerization can be conducted in the absence of added metal ions. For example, potassium persulfate, a common alternative initiator or co-initiator with ammonium persulfate, is not used, and mechanical and freeze coagulation described above may be used instead of coagulation with metal salts. It is also possible to use organic initiators as disclosed in U.S. Pat. No. 5,182,342 (Feiring et al.). To achieve such low ion content, ion exchange can be used, as described above, and the water for polymerization and washing may be deionized.

The metal ion content of the copolymer can be measured by flame atomic absorption spectrometry after combusting the copolymer and dissolving the residue in an acidic aqueous solution. For potassium as the analyte, the lower detection limit is less than 1 ppm.

In some embodiments of the methods of making the copolymer according to the present disclosure, radical polymerization also can be carried out by suspension polymerization. Suspension polymerization will typically produce particle sizes up to several millimeters.

A method for making the copolymers can include copolymerizing components including $SO_2F$-containing vinyl and allyl ethers (e.g., $CF_2=CF(CF_2)_a—(OC_bF_{2b})_c—O—(C_eF_{2e})—SO_2F$), isolating a solid from the polymer dispersion, hydrolyzing the polymer, optionally purifying the polymer by ion exchange purification, and drying the resulting polymer. In some embodiments, the method of making the copolymer includes copolymerizing components including at least one compound represented by formula $CF_2=CF(CF_2)_a—(OC_bF_{2b})_c—O—(C_eF_{2e})—SO_2X'$, optionally purifying the copolymer by ion-exchange purification, and spray drying the resulting dispersion. This method can conveniently eliminate the steps of isolating solid polymer and hydrolyzing, resulting in a more efficient and cost-effective process.

The components to be polymerized in the methods according to the present disclosure can include more than one compound represented by formula $CF_2=CF(CF_2)_a—(OC_bF_{2b})_c—O—(C_eF_{2e})—SO_2X''$. When more than one compound represented by formula $CF_2=CF(CF_2)_a—(OC_bF_{2b})_c—O—(C_eF_{2e})—SO_2X''$ is present, each of a, b, c, e, and X'' may be independently selected. In some embodiments, the components include compounds represented by formula $CF_2=CF(CF_2)_a—(OC_bF_{2b})_c—O—(C_eF_{2e})—SO_3Z$ and $CF_2=CF(CF_2)_a—(OC_bF_{2b})_c—O—(C_eF_{2e})—SO_2NZH$, wherein each a, b, c, and e is independently selected. The ratio between $SO_3Z$ and $SO_2NZH$-containing components may range from 99:1 to 1:99. In some of these embodiments, each Z is independently an alkali-metal cation or a quaternary ammonium cation.

In some embodiments of the methods according to the present disclosure, compounds represented by formula $CF_2=CF(CF_2)_a—(OC_bF_{2b})_c—O—(C_eF_{2e})—SO_2X'$ are not prepared in situ from compounds represented by formula $CF_2=CF(CF_2)_a—(OC_bF_{2b})_c—O—(C_eF_{2e})—SO_2F$. In some embodiments, the components to be polymerized in the method disclosed herein are substantially free of compounds represented by formula $CF_2=CF(CF_2)_a—(OC_bF_{2b})_c—O—(CF_2)—SO_2F$. In this regard, "substantially free of compounds represented by formula $CF_2=CF(CF_2)_a—(OC_bF_{2b})_c—O—(C_eF_{2e})—SO_{2F}$ may mean that the components to be polymerized in the method disclosed herein are free of compounds represented by formula $CF_2=CF(CF_2)_a—(OC_bF_{2b})_c—O—(C_eF_{2e})—SO_2F$ or that such compounds are present in an amount of up to 5, 4, 3, 2, 1, 0.5, 0.1, 0.05, or 0.01 mole percent, based on the total amount of components.

In other embodiments, a copolymer of the present disclosure can be made by copolymerizing a compound represented by formula $CF_2=CF(CF_2)_a—(OC_bF_{2b})_c—O—(C_eF_{2e})—SO_2F$ and fluorinated monomers as described above in any of their embodiments. In these embodiments, it is possible to hydrolyze some of the $CF_2=CF(CF_2)_a—(OC_bF_{2b})_c—O—O—(C_eF_{2e})—SO_2F$ (e.g., up to 5 ppm) to obtain an "in situ"-emulsifier as described above.

Fluoropolymers obtained by aqueous emulsion polymerization with inorganic initiators (e.g. persulfates, $KMnO_4$, etc.) typically have a high number of unstable carbon-based end groups (e.g. more than 200 —COOM or —COF end groups per $10^6$ carbon atoms, wherein M is hydrogen, a metal cation, or $NH_2$). For fluorinated ionomers useful, for example, in an electrochemical cell, the effect naturally increases as sulfonate equivalent weight decreases. These carbonyl end groups are vulnerable to peroxide radical attacks, which reduce the oxidative stability of the fluorinated ionomers. During operation of a fuel cell, electrolysis cell, or other electrochemical cell, peroxides can be formed. This degrades the fluorinated ionomers, and correspondingly reduces the operational life of the given electrolyte membrane.

As polymerized, the copolymer according to the present disclosure can have up to 400 —COOM and —COF end groups per $10^6$ carbon atoms, wherein M is independently an alkyl group, a hydrogen atom, a metallic cation, or a quaternary ammonium cation. Advantageously, in some embodiments, the copolymer according to the present disclosure has up to 200 unstable end groups per $10^6$ carbon atoms. The unstable end groups are —COOM or —COF groups, wherein M is an alkyl group, a hydrogen atom, a metallic cation, or a quaternary ammonium cation. In some embodiments, the copolymer has up to 150, 100, 75, 50, 40, 30, 25, 20, 15, or 10 unstable end groups per $10^6$ carbon atoms. The number of unstable end groups can be determined by Fourier-transform infrared spectroscopy using the method described below. In some embodiments, the copolymer according to the present disclosure has up to 50 (in some embodiments, up to 40, 30, 25, 20, 15, or 10) unstable end groups per $10^6$ carbon atoms, as polymerized.

Copolymers according to some embodiments of the present disclosure have —$SO_2X$ end groups. As described above, —$SO_2X$ end groups can be introduced in the copolymers according to the present disclosure by generating $SO_3^-$ radicals during the polymerization process.

In some embodiments, reducing the number of unstable end groups can be accomplished by carrying out the polymerization in the method disclosed herein in the presence of a salt or pseudohalogen as described in U.S. Pat. No. 7,214,740 (Lochhaas et al.). Suitable salts can include a chloride anion, a bromide anion, an iodide anion, or a cyanide anion and a sodium, potassium, or ammonium cation. The salt used in the free-radical polymerization may be a homogenous salt or a blend of different salts. Examples of useful pseudohalogens are nitrile-containing compounds, which provide nitrile end groups. Pseudohalogen nitrile-containing compounds have one or more nitrile groups and function in the same manner as compounds in which the nitrile groups are replaced with a halogen. Examples of suitable pseudohalogen nitrile-containing compounds include NC—CN, NC—S—S—CN, NCS—CN, Cl—CN, Br—CN, I—CN, NCN=NCN, and combinations thereof. During the free-radical polymerization, the reactive atoms/groups of the salts or the nitrile groups of the pseudohalogens chemically bond to at least one end of the backbone chain of the fluoropolymer. This provides $CF_2Y^1$ end groups instead of carbonyl end groups, wherein $Y^1$ is chloro, bromo, iodo, or nitrile. For example, if the free-radical polymerization is performed in the presence of a KCl salt, at least one of the end groups provided would be a —$CF_2Cl$ end group. Alternatively, if the free-radical polymerization is performed in the presence of a NC—CN pseudohalogen, at least one of the end groups provided would be a —$CF_2CN$ end group.

Post-fluorination with fluorine gas is also commonly used to cope with unstable end groups and any concomitant degradation. Post-fluorination of the fluoropolymer can convert —COOH, amide, hydride, —COF, —$CF_2Y^1$ and other nonperfluorinated end groups or —CF=$CF_2$ to —$CF_3$ groups. The post-fluorination may be carried out in any convenient manner. The post-fluorination can be conveniently carried out with nitrogen/fluorine gas mixtures in ratios of 75-90:25-10 at temperatures between 20° C. and 250° C., in some embodiments in a range of 150° C. to 250° C. or 70° C. to 120° C., and pressures from 10 KPa to 1000 KPa. Reaction times can range from about four hours to about 16 hours. Under these conditions, most unstable carbon-based end groups are removed, whereas —$SO_2X$ groups mostly survive and are converted to —$SO_2F$ groups. In some embodiments, post-fluorination is not carried out when non-fluorinated monomers described above are used as monomers in the polymerization or when the copolymer according to the present disclosure includes divalent units independently represented by formula:

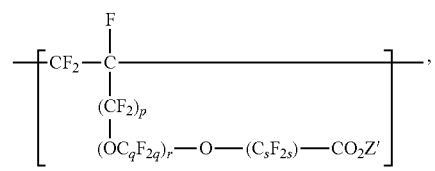

as described above in any of their embodiments.

The groups $Y^1$ in the end groups —$CF_2Y^1$, described above, are reactive to fluorine gas, which reduces the time and energy required to post-fluorinate the copolymers in these embodiments. We have also found that the presence of alkali-metal cations in the copolymer increases the decomposition rate of unstable carboxylic end-groups and therefore makes a subsequent post-fluorination step, if needed, easier, faster, and cheaper.

For copolymers in which the —$SO_2X$ groups are —$SO_2F$ groups, the copolymer can be treated with an amine (e.g., ammonia) to provide a sulfonamide (e.g., having —$SO_2NH_2$ groups). Sulfonamides made in this manner or prepared by using $CF_2$=$CFCF_2$—$(OC_bF_{2b})_c$—O—$(CF_2)_e$—$SO_2NH_2$ in the components that are polymerized as described above can be further reacted with multi-functional sulfonyl fluoride or sulfonyl chloride compounds. Examples of useful multi-functional compounds include 1,1,2,2-tetrafluoroethyl-1,3-disulfonyl fluoride; 1,1,2,2,3,3-hexafluoropropyl-1,3-disulfonyl fluoride; 1,1,2,2,3,3,4,4-octafluorobutyl-1,4-disulfonyl fluoride; 1,1,2,2,3,3,4,4,5,5-perfluoropentyl-1,5-disulfonyl fluoride; 1,1,2,2-tetrafluoroethyl-1,2-disulfonyl chloride; 1,1,2,2,3,3-hexafluoropropyl-1,3-disulfonyl chloride; 1,1,2,2,3,3,4,4-octafluorobutyl-1,4-disulfonyl chloride; and 1,1,2,2,3,3,4,4,5,5-perfluoropentyl-1,5-disulfonyl chloride. After hydrolysis of the sulfonyl halide groups, the resulting copolymer, in which X is —$NZSO_2(CF_2)_{1-6}SO_3Z$, can have a higher number of ionic groups than the copolymer as polymerized. Thus, the number of ionic groups can be increased and the equivalent weight decreased without affecting the backbone structure of the copolymer. Also, using a deficient amount multi-functional sulfonyl fluoride or sulfonyl chloride compounds can result in crosslinking of the polymer chains, which may be useful to improve durability in some cases (e.g., for copolymers having low equivalent weights). Further details can be found, for example, in U.S. Pat. Appl. Publ. No. 20020160272 (Tanaka et al.). To prevent such crosslinking, if desired, copolymers bearing —$SO_2NH_2$ groups can be treated with compounds represented by formula $FSO_2(CF_2)_{1-6}SO_3H$, which can be made by hydrolyzing any of the multi-functional sulfonyl fluorides or sulfonyl chlorides described above with one equivalent of water in the presence of base (e.g., N,N-diisopropylethylamine (DIPEA)) as described in JP 2011-40363, published Feb. 24, 2011. Copolymers bearing $SO_2NH_2$ groups can also treated with polysulfonimides represented by formula $FSO_2(CF_2)_a[SO_2NZSO_2(CF_2)_a]_{1-10}SO_2F$ or $FSO_2(CF_2)_a[SO_2NZSO_2(CF_2)_a]_{1-10}SO_3H$, wherein each a is independently 1 to 6, 1 to 4, or 2 to 4. To make a polysulfonimide, a sulfonyl halide monomer (e.g., any of those described above) and a sulfonamide monomer represented by formula $H_2NSO_2(CF_2)_aSO_2NH_2$ are made to react in the mole ratio of (k+1)/k, in which k represents the moles of sulfonamide monomer and k+1 represents the moles of sulfonyl halide monomer. The reaction may be carried out, for example, in a suitable solvent (e.g., acetonitrile) at 0° C. in the presence of base. The sulfonyl halide monomer and sulfonamide monomer may have the same or different values of a, resulting in the same or different value of a for each repeating unit. The resulting product (e.g., $FSO_2(CF_2)_a[SO_2NZSO_2(CF_2)_a]_{1-10}SO_2F$) may be treated with one equivalent of water in the presence of base (e.g., N,N-diisopropylethylamine (DIPEA)) to provide, for example, $FSO_2(CF_2)_a[SO_2NZSO_2(CF_2)_a]_{1-10}SO_3H$, as described in JP 2011-40363.

In other embodiments, copolymers in which the $-SO_2X$ groups are $-SO_2F$ groups can be treated with small molecule sulfonamides such as those represented by formula $NH_2SO_2(CF_2)_{1-6}SO_3Z$, wherein Z is as defined above in any of its embodiments, to provide $-SO_2NHSO_2(CF_2)_{1-6}SO_3Z$ groups. Compounds represented by formula $NH_2SO_2(CF_2)_{1-6}SO_3Z$ may be synthesized by reacting cyclic perfluorodisulfonic acid anhydrides with amines according to the methods described in U.S. Pat. No. 4,423,197 (Behr). This can also provide copolymers with very low equivalent weights.

Some conventional fluoropolymers can be difficult to disperse. A technique that can be useful for dispersing a fluoropolymer in a desired medium is up-concentration of a dilute dispersion of fluoropolymer. For example, U.S. Pat. Appl. Pub. Nos. 2017/0183435 (Inc) reports preparing a fluoropolymer electrolyte solution by heating a solid fluoropolymer electrolyte in a solution of 50% by weight solution of ethanol in water in an autoclave at 160° C. with stirring for five hours to achieve a fluoropolymer electrolyte solution with a solids concentration of 5% by weight. Concentration under reduced pressure provided a fluoropolymer electrolyte solution with a solids concentration of 20% by weight.

By contrast, the copolymer disclosed herein can typically be directly dispersed at a concentration of at least 10, 15, 20, or 25 percent by weight in a solution of water and organic solvent without the need for up-concentrating. In some embodiments, the copolymer disclosed herein can be directly dispersed at a concentration of up to 30, 40, or 50 percent by weight in a solution of water and organic solvent without the need for up-concentrating. A useful method includes combining components comprising water, an organic solvent, and at least ten percent by weight of the copolymer of the present disclosure, based on the total weight of the components, and mixing the components at ambient temperature and pressure to make a fluoropolymer dispersion. In this method, it should be understood that combining components comprising at least ten percent by weight of the copolymer, based on the total weight of the components, refers to the concentration of the copolymer when the components are initially combined (e.g., when organic solvent is first added to an aqueous dispersion of the fluoropolymer) before any agitation of the combined components. In some embodiments of this method, X is OZ, and Z is hydrogen. Examples of suitable organic solvents useful for preparing fluoropolymer dispersions of the copolymer of the present disclosure include, lower alcohols (e.g., methanol, ethanol, isopropanol, n-propanol), polyols (e.g., ethylene glycol, propylene glycol, glycerol), ethers (e.g., tetrahydrofuran and dioxane), diglyme, polyglycol ethers, ether acetates, acetonitrile, acetone, dimethylsulfoxide (DMSO), N,N dimethyacetamide (DMA), ethylene carbonate, propylene carbonate, dimethylcarbonate, diethylcarbonate, N,N-dimethylformamide (DMF), N-methylpyrrolidinone (NMP), dimethylimidazolidinone, butyrolactone, hexamethylphosphoric triamide (HMPT), isobutyl methyl ketone, sulfolane, and combinations thereof. In some embodiments, the copolymer, water, and organic solvent can be heated at a pressure of up to 0.2 MPa or 0.15 MPa at a temperature of up to 100° C., 90° C., 80° C., 70° C., 60° C., 50° C., or 40° C. Advantageously, the fluoropolymer dispersion may also be made at ambient temperature and pressure.

The copolymer of the present disclosure may be useful, for example, in the manufacture of catalyst ink and polymer electrolyte membranes for use in fuel cells or other electrolytic cells. A membrane electrode assembly (MEA) is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. Each electrode layer includes electrochemical catalysts, typically including platinum metal. Gas diffusion layers (GDL's) facilitate gas transport to and from the anode and cathode electrode materials and conduct electrical current. The GDL may also be called a fluid transport layer (FTL) or a diffuser/current collector (DCC). The anode and cathode electrode layers may be applied to GDL's in the form of a catalyst ink, and the resulting coated GDL's sandwiched with a PEM to form a five-layer MEA. Alternately, the anode and cathode electrode layers may be applied to opposite sides of the PEM in the form of a catalyst ink, and the resulting catalyst-coated membrane (CCM) sandwiched with two GDL's to form a five-layer MEA. Details concerning the preparation of catalyst inks and their use in membrane assemblies can be found, for example, in U.S. Pat. Publ. No. 2004/0107869 (Velamakanni et al.). In atypical PEM fuel cell, protons are formed at the anode via hydrogen oxidation and transported across the PEM to the cathode to react with oxygen, causing electrical current to flow in an external circuit connecting the electrodes. The PEM forms a durable, non-porous, electrically non-conductive mechanical barrier between the reactant gases, yet it also passes $H^+$ ions readily.

The copolymer of the present disclosure may be useful for making a catalyst ink composition. In some embodiments, the copolymer (e.g., as a component of the fluoropolymer dispersion described above) can be combined with catalyst particles (e.g., metal particles or carbon-supported metal particles). A variety of catalysts may be useful. Typically, carbon-supported catalyst particles are used. Typical carbon-supported catalyst particles are 50% to 90% carbon and 10% to 50% catalyst metal by weight, the catalyst metal typically comprising platinum for the cathode and platinum and ruthenium in a weight ratio of 2:1 for the anode. However, other metals may be useful, for example, gold, silver, palladium, iridium, rhodium, ruthenium, iron, cobalt, nickel, chromium, tungsten, manganese, vanadium, and alloys thereof. To make an MEA or CCM, catalyst ink may be applied to the PEM by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications. Advantageously, copolymers according to the present disclosure may be useful for making a catalyst layer with one coating application. The catalyst ink may be applied to a PEM or a GDL directly, or the catalyst ink may be applied to a transfer substrate, dried, and thereafter applied to the PEM or to the FTL as a decal.

In some embodiments, the catalyst ink includes the copolymer disclosed herein at a concentration of at least 10, 15, or 20 percent by weight and up to 30 percent by weight, based on the total weight of the catalyst ink. In some embodiment, the catalyst ink includes the catalyst particles in an amount of at least 10, 15, or 20 percent by weight and up to 50, 40, or 30 percent by weight, based on the total weight of the catalyst ink. The catalyst particles may be added to the fluoropolymer dispersion made as described above in any of its embodiments. The resulting catalyst ink may be mixed, for example, with heating. The percent solid in the catalyst ink may be selected, for example, to obtain desirable rheological properties. Examples of suitable organic solvents useful for including in the catalyst ink include, lower alcohols (e.g., methanol, ethanol, isopropanol, n-propanol), polyols (e.g., ethylene glycol, propylene glycol, glycerol), ethers (e.g., tetrahydrofuran and dioxane), diglyme, polyglycol ethers, ether acetates, acetonitrile, acetone, dimethylsulfoxide (DMSO), N,N dimethyacetamide (DMA), ethylene carbonate, propylene carbonate, dimethylcarbonate, diethylcarbonate, N,N-dimethylformamide (DMF), N-methylpyrrolidinone (NMP), dimethylimidazolidinone, butyrolactone, hexamethylphosphoric triamide (HMPT), isobutyl methyl ketone, sulfolane, and combinations thereof. In some embodiments, the catalyst ink contains 0% to 50% by weight of a lower alcohol and 0% to 20% by weight of a polyol. In addition, the ink may contain 0% to 2% of a suitable dispersant.

In some embodiments, the copolymer of the present disclosure may be useful as a polymer electrolyte membrane. The copolymer may be formed into a polymer electrolyte membrane by any suitable method, including casting, molding, and extrusion. Typically, the membrane is cast from a fluoropolymer dispersion (e.g., those described above in any of their embodiments) and then dried, annealed, or both. The copolymer may be cast from a suspension. Any suitable casting method may be used, including bar coating, spray coating, slit coating, and brush coating. After forming, the membrane may be annealed, typically at a temperature of 120° C. or higher, more typically 130° C. or higher, most typically 150° C. or higher. In some embodiments of the method according to the present disclosure, a polymer electrolyte membrane can be obtained by obtaining the copolymer in a fluoropolymer dispersion, optionally purifying the dispersion by ion-exchange purification, and concentrating the dispersion to make a membrane. Typically, if the fluoropolymer dispersion is to be used to form a membrane, the concentration of copolymer is advantageously high (e.g., at least 20, 30, or 40 percent by weight). Often a water-miscible organic solvent is added to facilitate film formation. Examples of water-miscible solvents include, lower alcohols (e.g., methanol, ethanol, isopropanol, n-propanol), polyols (e.g., ethylene glycol, propylene glycol, glycerol), ethers (e.g., tetrahydrofuran and dioxane), ether acetates, acetonitrile, acetone, dimethylsulfoxide (DMSO), N,N dimethyacetamide (DMA), ethylene carbonate, propylene carbonate, dimethylcarbonate, diethylcarbonate, N,N-dimethylformamide (DMF), N-methylpyrrolidinone (NMP), dimethylimidazolidinone, butyrolactone, hexamethylphosphoric triamide (HMPT), isobutyl methyl ketone, sulfolane, and combinations thereof.

The present disclosure provides a membrane electrode assembly comprising at least one of a catalyst ink comprising the copolymer of the present disclosure or a polymer electrolyte membrane comprising the copolymer of the present disclosure. In some embodiments, both the polymer electrolyte membrane and catalyst ink comprise embodiments of the copolymer disclosed herein. The catalyst ink and polymer electrolyte membrane may use the same or different copolymers. In some embodiments, the catalyst ink comprises the copolymer of the present disclosure, and the polymer electrolyte membrane includes a conventional copolymer (e.g., one that does not include one or more divalent units independently represented by formula:

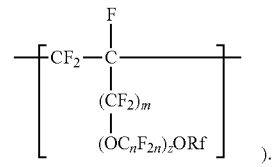

).

In some embodiments, the polymer electrolyte membrane is prepared from the copolymer of the present disclosure, and the catalyst ink includes a conventional copolymer (e.g., one that does not include one or more divalent units independently represented by formula:

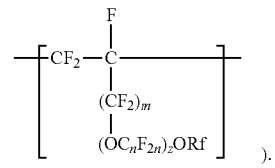

).

In some embodiments of the polymer electrolyte membrane of the present disclosure, a salt of at least one of cerium, manganese or ruthenium or one or more cerium oxide or zirconium oxide compounds is added to the acid form of the copolymer before membrane formation. Typically the salt of cerium, manganese, or ruthenium and/or the cerium or zirconium oxide compound is mixed well with or dissolved within the copolymer to achieve substantially uniform distribution.

The salt of cerium, manganese, or ruthenium may comprise any suitable anion, including chloride, bromide, hydroxide, nitrate, sulfonate, acetate, phosphate, and carbonate. More than one anion may be present. Other salts may be present, including salts that include other metal cations or ammonium cations. Once cation exchange occurs between the transition metal salt and the acid form of the ionomer, it may be desirable for the acid formed by combination of the liberated proton and the original salt anion to be removed. Thus, it may be useful to use anions that generate volatile or soluble acids, for example chloride or nitrate. Manganese cations may be in any suitable oxidation state, including $Mn^{2+}$, $Mn^{3+}$, and $Mn^{4+}$, but are most typically $Mn^{2+}$. Ruthenium cations may be in any suitable oxidation state, including $Ru^{3+}$ and $Ru^{4+}$, but are most typically $Ru^{3+}$. Cerium cations may be in any suitable oxidation state, including $Ce^{3+}$ and $Ce^{4+}$. Without wishing to be bound by theory, it is believed that the cerium, manganese, or ruthenium cations persist in the polymer electrolyte because they are exchanged with $H^+$ ions from the anion groups of the polymer electrolyte and become associated with those anion groups. Furthermore, it is believed that polyvalent cerium, manganese, or ruthenium cations may form crosslinks between anion groups of the polymer electrolyte, further adding to the stability of the polymer. In some embodiments, the salt may be present in solid form. The cations may be present in a combination of two or more forms including solvated cation, cation associated with bound anion groups of the polymer electrolyte membrane, and cation bound in a salt precipitate. The amount of salt added is typically between 0.001 and 0.5 charge equivalents based on the molar amount of acid functional groups present in the polymer electrolyte, more typically between 0.005 and 0.2, more typically between 0.01 and 0.1, and more typically between 0.02 and 0.05. Further details for combining an anionic copolymer with cerium, manganese, or ruthenium cations can be found in U.S. Pat. Nos. 7,575,534 and 8,628,871, each to Frey et al.

The cerium oxide compound may contain cerium in the (IV) oxidation state, the (III) oxidation state, or both and may be crystalline or amorphous. The cerium oxide may be, for example, $CeO_2$ or $Ce_2O_3$. The cerium oxide may be substantially free of metallic cerium or may contain metallic cerium. The cerium oxide may be, for example, a thin oxidation reaction product on a metallic cerium particle. The cerium oxide compound may or may not contain other metal elements. Examples of mixed metal oxide compounds comprising cerium oxide include solid solutions such as zirconia-ceria and multicomponent oxide compounds such as barium cerate. Without wishing to be bound by theory, it is believed that the cerium oxide may strengthen the polymer by chelating and forming crosslinks between bound anionic groups. The amount of cerium oxide compound added is typically between 0.01 and 5 weight percent based on the total weight of the copolymer, more typically between 0.1 and 2 weight percent, and more typically between 0.2 and 0.3 weight percent. The cerium oxide compound is typically present in an amount of less than 1% by volume relative to the total volume of the polymer electrolyte membrane, more typically less than 0.8% by volume, and more typically less than 0.5% by volume. Cerium oxide may be in particles of any suitable size, in some embodiments, between 1 nm and 5000 nm, 200 nm to 5000 nm, or 500 nm to 1000 nm. Further details regarding polymer electrolyte membranes including cerium oxide compounds can be found in U.S. Pat. No. 8,367,267 (Frey et al.).

The polymer electrolyte membrane, in some embodiments, may have a thickness of up to 90 microns, up to 60 microns, or up to 30 microns. A thinner membrane may provide less resistance to the passage of ions. In fuel cell use, this results in cooler operation and greater output of usable energy. Thinner membranes must be made of materials that maintain their structural integrity in use.

In some embodiments, the copolymer of the present disclosure may be imbibed into a porous supporting matrix, typically in the form of a thin membrane having a thickness of up to 90 microns, up to 60 microns, or up to 30 microns. Any suitable method of imbibing the polymer into the pores of the supporting matrix may be used, including overpressure, vacuum, wicking, and immersion. In some embodiments, the copolymer is embedded in the matrix upon crosslinking. Any suitable supporting matrix may be used. Typically the supporting matrix is electrically non-conductive. Typically, the supporting matrix is composed of a fluoropolymer, which is more typically perfluorinated. Typical matrices include porous polytetrafluoroethylene (PTFE), such as biaxially stretched PTFE webs. In another embodiment fillers (e.g. fibers) might be added to the polymer to reinforce the membrane.

To make an MEA, GDL's may be applied to either side of a CCM by any suitable means. Any suitable GDL may be used in the practice of the present disclosure. Typically the GDL is comprised of sheet material comprising carbon fibers. Typically the GDL is a carbon fiber construction selected from woven and non-woven carbon fiber constructions. Carbon fiber constructions which may be useful in the practice of the present disclosure may include Toray™ Carbon Paper, SpectraCarb™ Carbon Paper, AFN™ non-woven carbon cloth, and Zoltek™ Carbon Cloth. The GDL may be coated or impregnated with various materials, including carbon particle coatings, hydrophilizing treatments, and hydrophobizing treatments such as coating with polytetrafluoroethylene (PTFE).

In use, the MEA according to the present disclosure is typically sandwiched between two rigid plates, known as distribution plates, also known as bipolar plates (BPP's) or monopolar plates. Like the GDL, the distribution plate is typically electrically conductive. The distribution plate is typically made of a carbon composite, metal, or plated metal material. The distribution plate distributes reactant or product fluids to and from the MEA electrode surfaces, typically through one or more fluid-conducting channels engraved, milled, molded or stamped in the surface(s) facing the MEA(s). These channels are sometimes designated a flow field. The distribution plate may distribute fluids to and from two consecutive MEA's in a stack, with one face directing fuel to the anode of the first MEA while the other face directs oxidant to the cathode of the next MEA (and removes product water), hence the term "bipolar plate." Alternately, the distribution plate may have channels on one side only, to distribute fluids to or from an MEA on only that side, which may be termed a "monopolar plate." A typical fuel cell stack comprises a number of MEA's stacked alternately with bipolar plates.

Another type of electrochemical device is an electrolysis cell, which uses electricity to produce chemical changes or chemical energy. An example of an electrolysis cell is a chlor-alkali membrane cell where aqueous sodium chloride is electrolyzed by an electric current between an anode and a cathode. The electrolyte is separated into an anolyte portion and a catholyte portion by a membrane subject to harsh conditions. In chlor-alkali membrane cells, caustic sodium hydroxide collects in the catholyte portion, hydrogen gas is evolved at the cathode portion, and chlorine gas is evolved from the sodium chloride-rich anolyte portion at the anode. The copolymer of the present disclosure may be useful, for example, in the manufacture of catalyst ink and electrolyte membranes for use in chlor-alkali membrane cells or other electrolytic cells.

The copolymer according to the present disclosure may also be useful has a binder for an electrode in other electrochemical cells (for example, lithium ion batteries). To make electrodes, powdered active ingredients can be dispersed in a solvent with the copolymer and coated onto a metal foil substrate, or current collector. The resulting composite electrode contains the powdered active ingredient in the polymer binder adhered to the metal substrate. Useful active materials for making negative electrodes include alloys of main group elements and conductive powders such as graphite. Examples of useful active materials for making a negative electrode include oxides (tin oxide), carbon compounds (e.g., artificial graphite, natural graphite, soil black lead, expanded graphite, and scaly graphite), silicon carbide compounds, silicon-oxide compounds, titanium sulfides, and boron carbide compounds. Useful active materials for making positive electrodes include lithium compounds, such as $Li_{4/3}Ti_{5/3}O_4$, $LiV_3O_8$, $LiV_2O_5$, $LiCo_{0.2}Ni_{0.8}O_2$, $LiNiO_2$, $LiFePO_4$, $LiMnPO_4$, $LiCoPO_4$, $LiMn_2O_4$, and $LiCoO_2$. The electrodes can also include electrically conductive diluents and adhesion promoters.

Electrochemical cells including the copolymer disclosed herein as a binder can be made by placing at least one each of a positive electrode and a negative electrode in an electrolyte. Typically, a microporous separator can be used to prevent the contact of the negative electrode directly with the positive electrode. Once the electrodes are connected externally, lithiation and delithiation can take place at the electrodes, generating a current. A variety of electrolytes can be employed in a lithium-ion cell. Representative electrolytes contain one or more lithium salts and a charge-carrying medium in the form of a solid, liquid, or gel. Examples of lithium salts include $LiPF_6$, $LiBF_4$, $LiClO_4$, lithium bis(oxalato)borate, $LiN(CF_3SO_2)_2$, $LiN(C_2F_5SO_2)_2$, $LiAsF_6$, $LiC(CF_3SO_2)_3$, and combinations thereof. Examples of solid charge carrying media include polymeric media such as polyethylene oxide, polytetrafluoroethylene, polyvinylidene fluoride, fluorine-containing copolymers, polyacrylonitrile, combinations thereof, and other solid media that will be familiar to those skilled in the art. Examples of liquid charge carrying media include ethylene carbonate, propylene carbonate, dimethyl carbonate, diethyl carbonate, ethyl methyl carbonate, butylene carbonate, vinylene carbonate, fluoroethylene carbonate, fluoropropylene carbonate, gamma-butyrolactone, methyl difluoroacetate, ethyl difluoroacetate, dimethoxyethane, diglyme (bis(2-methoxyethyl) ether), tetrahydrofuran, dioxolane, combinations thereof and other media that will be familiar to those skilled in the art. Examples of charge carrying media gels include those described in U.S. Pat. No. 6,387,570 (Nakamura et al.) and U.S. Pat. No. 6,780,544 (Noh). The electrolyte can include other additives (e.g., a cosolvent or a redox chemical shuttle).

The electrochemical cells can be useful as rechargeable batteries and can be used in a variety of devices, including portable computers, tablet displays, personal digital assistants, mobile telephones, motorized devices (e.g., personal or household appliances and vehicles), instruments, illumination devices (e.g., flashlights) and heating devices. One or more of the electrochemical cells can be combined to provide battery pack.

Some Embodiments of the Disclosure

In a first embodiment, the present disclosure provides a copolymer comprising:
divalent units represented by formula —[$CF_2$—$CF_2$]—;
divalent units independently represented by formula:

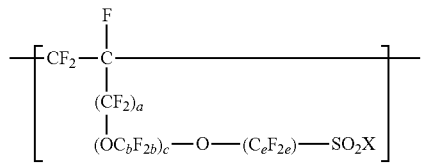

wherein a is 0 or 1, b is 2 to 8, c is 0 to 2, e is 1 to 8, and each X is independently F, —NZH, —NZSO$_2$(CF$_2$)$_{1-6}$SO$_2$X', —NZ[SO$_2$(CF$_2$)$_d$SO$_2$NZ]$_{1-10}$SO$_2$(CF$_2$)$_d$SO$_2$X', or —OZ, wherein Z is independently a hydrogen, an alkyl group having up to four carbon atoms, an alkali-metal cation or a quaternary ammonium cation, X' is independently —NZH or —OZ, and each d is independently 1 to 6; and one or more divalent units independently represented by formula:

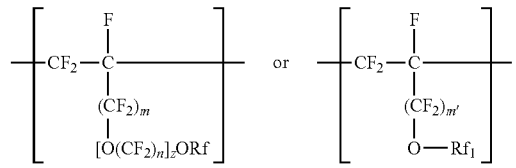

wherein Rf is a linear or branched perfluoroalkyl group having from 1 to 8 carbon atoms and optionally interrupted by one or more —O— groups, z is 1 or 2, each n is independently from 1, 3, or 4, m is 0 or 1, m' is 0 or 1, and Rf$_1$ is a branched perfluoroalkyl group having from 3 to 8 carbon atoms, with the proviso that if z is 2, one n may also be 2, with the proviso that if a is 1, n may also be 2, and with the further proviso that when m' is 1, Rf$_1$ is a branched perfluoroalkyl group having from 3 to 8 carbon atoms or a linear perfluoroalkyl group having 5 to 8 carbon atoms.

In a second embodiment, the present disclosure provides a copolymer comprising: divalent units represented by formula [$CF_2$—$CF_2$]—;
divalent units independently represented by formula:

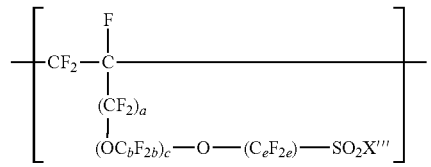

wherein a is 0 or 1, b is 2 to 8, c is 0 to 2, e is 1 to 8, and each X''' is independently —NZH, —NZSO$_2$(CF$_2$)$_{1-6}$SO$_2$X', or —NZ[SO$_2$(CF$_2$)$_d$SO$_2$NZ]$_{1-10}$SO$_2$(CF$_2$)$_d$SO$_2$X', wherein Z is a hydrogen, an alkali-metal cation or a quaternary ammonium cation, X' is independently —NZH or —OZ and each d is independently 1 to 6; and one or more other fluorinated divalent units independently represented by formula:

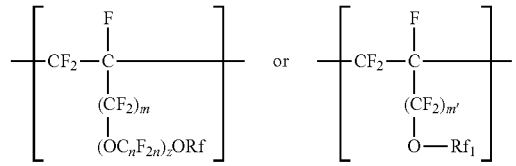

wherein Rf is a linear or branched perfluoroalkyl group having from 1 to 8 carbon atoms and optionally interrupted by one or more —O— groups, z is 1 or 2, each n is independently from 1 to 4, m is 0 or 1, m' is 0 or 1, and Rf$_1$ is a branched perfluoroalkyl group having from 3 to 8 carbon atoms, with the proviso that when m' is 1, Rf$_1$ is a branched perfluoroalkyl group having from 3 to 8 carbon atoms or a linear perfluoroalkyl group having 5 to 8 carbon atoms.

In a third embodiment, the present disclosure provides the copolymer of the first or second embodiment, wherein b is 2 or 3, c is 0 or 1, and e is 2 or 4.

In a fourth embodiment, the present disclosure provides the copolymer of any one of the first to third embodiments, wherein when a is 0, then n is not 3.

In a fifth embodiment, the present disclosure provides the copolymer of any one of the first to fourth embodiments, wherein when a and c are 0, then e is not 2.

In a sixth embodiment, the present disclosure provides the copolymer of any one of the first to fifth embodiments, wherein at least one n is 1.

In a seventh embodiment, the present disclosure provides the copolymer of any one of the first to sixth embodiments, further comprising at least one of divalent units derived from chlorotrifluoroethylene or divalent units derived from hexafluoropropylene.

In an eighth embodiment, the present disclosure provides the copolymer of any one of the first to seventh embodiments, wherein the copolymer comprises the divalent units independently represented by formula

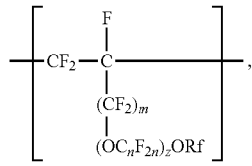

and wherein at least one of a is 1 or m is 1.

In a ninth embodiment, the present disclosure provides the copolymer of any one of the first to eighth embodiments, further comprising divalent units independently represented by formula:

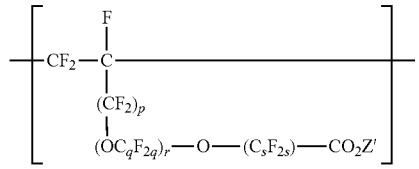

wherein p is 0 or 1, q is 2 to 8, r is 0 to 2, s is 1 to 8, and Z' is a hydrogen, an alkyl group having up to four carbon atoms, an alkali-metal cation or a quaternary ammonium cation.

In a tenth embodiment, the present disclosure provides the copolymer of any one of the first to ninth embodiments, wherein the divalent units comprise at least 60 mole % of [$CF_2$—$CF_2$]—, based on the total amount of divalent units in the copolymer.

In an eleventh embodiment, the present disclosure provides the copolymer of any one of the first to tenth embodiments, further comprising divalent units are derived from bisolefins represented by formula $X_2C=CY$—$(CW_2)_m$—$(O)_n$—$R_F$—$(O)_o$—$(CW_2)_p$—$CY=CX_2$, wherein each of X, Y, and W is independently fluoro, hydrogen, alkyl, alkoxy, polyoxyalkyl, perfluoroalkyl, perfluoroalkoxy or perfluoropolyoxyalkyl, m and p are independently an integer from 0 to 15, and n, o are independently 0 or 1.

In a twelfth embodiment, the present disclosure provides the copolymer of the eleventh embodiment, wherein X, Y, and W are each independently fluoro, $CF_3$, $C_2F_5$, $C_3F_7$, $C_4F_9$, hydrogen, $CH_3$, $C_2H_5$, $C_3H_7$, $C_4H_9$.

In a thirteenth embodiment, the present disclosure provides the copolymer of any one of the first to twelfth embodiments, wherein at least a portion of X groups are —OZ.

In a fourteenth embodiment, the present disclosure provides the copolymer of any one of the first to thirteenth embodiments, wherein Z is an alkali metal cation.

In a fifteenth embodiment, the present disclosure provides the copolymer of any one of the first to twelfth embodiments, wherein Z is hydrogen.

In a sixteenth embodiment, the present disclosure provides the copolymer of any one of the first to fifteenth embodiments, wherein the copolymer has an —$SO_2X$ equivalent weight in a range from 300 to 2000.

In a seventeenth embodiment, the present disclosure provides the copolymer of the sixteenth embodiment, wherein the copolymer has an —$SO_2X$ equivalent weight greater than 1000.

In an eighteenth embodiment, the present disclosure provides the copolymer of any one of the first to seventeenth embodiments, wherein at least a portion of X groups are —NZH groups.

In a nineteenth embodiment, the present disclosure provides the copolymer of any one of the first to eighteenth embodiments, further comprising divalent units derived from at least one of ethylene, propylene, isobutylene, ethyl vinyl ether, vinyl benzoate, ethyl allyl ether, cyclohexyl allyl ether, norbornadiene, crotonic acid, an alkyl crotonate, acrylic acid, an alkyl acrylate, methacrylic acid, an alkyl methacrylate, or hydroxybutyl vinyl ether.

In a twentieth embodiment, the present disclosure provides the copolymer of any one of the first to nineteenth embodiments, wherein the copolymer has up to 100 —COOM and —COF end groups per $10^6$ carbon atoms, wherein M is independently an alkyl group, a hydrogen atom, a metallic cation, or a quaternary ammonium cation.

In a twenty-first embodiment, the present disclosure provides the copolymer of any one of the first to twentieth embodiments, wherein the copolymer has a glass transition temperature of up to 20° C.

In a twenty-second embodiment, the present disclosure provides the copolymer of any one of the first to twenty-first embodiments, wherein the copolymer has an alpha transition temperature [$T(\alpha)$] of at least 100° C.

In a twenty-third embodiment, the present disclosure provides the copolymer of any one of the first to twenty-first embodiments, wherein the copolymer has a $T(\alpha)$ of up to 100° C. or less than 100° C.

In a twenty-fourth embodiment, the present disclosure provides the copolymer of any one of the first to twenty-third embodiments, wherein at least one of c is 1 or 2 ore is 3 to 8.

In a twenty-fifth embodiment, the present disclosure provides the copolymer of any one of the first to twenty-fourth embodiments, wherein the divalent units independently represented by formula

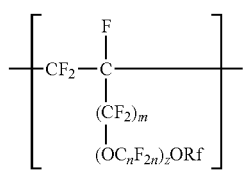

are present at up to 20 or up to 15 mole percent, or in a range from 3 to 20 or 4 to 15 mole percent, based on the total moles of divalent units in the copolymer.

In a twenty-sixth embodiment, the present disclosure provides the copolymer of any one of the first to twenty-fifth embodiments, wherein the divalent units independently represented by formula

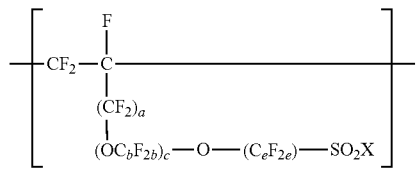

are present at up to 30 or up to 25 mole percent, or in a range from 10 to 30 or 15 to 25 mole percent, based on the total moles of divalent units in the copolymer.

In a twenty-seventh embodiment, the present disclosure provides a polymer electrolyte membrane comprising the copolymer of any one of the first to twenty-sixth embodiments.

In a twenty-eighth embodiment, the present disclosure provides the polymer electrolyte membrane of the twenty-seventh embodiment, wherein the polymer electrolyte membrane further comprises at least one of cerium cations, manganese cations, ruthenium cations, or a cerium oxide.

In a twenty-ninth embodiment, the present disclosure provides the polymer electrolyte membrane of the twenty-eighth embodiment, wherein the at least one of cerium cations, manganese cations, or ruthenium cations are present in a range from 0.2 to 20 percent relative to the amount of sulfonate groups in the copolymer.

In a thirtieth embodiment, the present disclosure provides a catalyst ink comprising the copolymer of any one of the first to twenty-sixth embodiments.

In a thirty-first embodiment, the present disclosure provides a membrane electrode assembly comprising at least one of the polymer electrolyte membrane of any one of the twenty-seventh to twenty-ninth embodiments or the catalyst ink of the thirtieth embodiment.

In a thirty-second embodiment, the present disclosure provides a binder for an electrode comprising the copolymer of any one of the first to twenty-sixth embodiments.

In a thirty-third embodiment, the present disclosure provides an electrochemical cell comprising the binder of the thirty-second embodiment.

In a thirty-fourth embodiment, the present disclosure provides a method of making the copolymer of any one of first to twenty-sixth embodiments, the method comprising copolymerizing components comprising tetrafluoroethylene, a compound independently represented by formula $CF_2=CF(CF_2)_a-(OC_bF_{2b})_c-O-(C_eF_{2e})-SO_2X''$, and at least one perfluoroalkoxyalkyl vinyl ether, perfluoroalkoxyalkyl allyl ether, perfluoroalkylvinyl ether, or perfluoroalkyl allyl ether, wherein b is 2 to 8, c is 0 to 2, e is 1 to 8, and X'' is —F, —NZH or —OZ, wherein Z is a hydrogen, methyl, an alkali-metal cation, or a quaternary ammonium cation.

In a thirty-fifth embodiment, the present disclosure provides the method of the thirty-fourth embodiment, wherein copolymerizing is carried out by aqueous emulsion polymerization.

In a thirty-sixth embodiment, the present disclosure provides the method of the thirty-fourth or thirty-fifth embodiment, wherein the copolymerizing is carried out at a pH higher than 8.

In a thirty-seventh embodiment, the present disclosure provides the method of any one of the thirty-fourth to thirty-sixth embodiments, wherein copolymerizing is carried out in the presence of a bisulfate or sulfite salt to generate —SO₂X end groups, wherein X is independently —NZH or —OZ, wherein each Z is independently a hydrogen, methyl, an alkali-metal cation or a quaternary ammonium cation.

In a thirty-eighth embodiment, the present disclosure provides the method of any one of the thirty-fourth to thirty-seventh embodiments, wherein the copolymerizing is carried out in the absence of a fluorinated emulsifier.

In a thirty-ninth embodiment, the present disclosure provides the method of any one of the thirty-fourth to thirty-eighth embodiments, wherein the copolymer comprises anionic species that are not covalently bound to the ionomer, the method further comprising contacting a dispersion of the copolymer with an anion exchange resin having associated hydroxide ions, and exchanging at least a portion of the anionic species with the hydroxide ions to provide an anionic exchanged dispersion.

In a fortieth embodiment, the present disclosure provides the method of any one of the thirty-fourth to thirty-ninth embodiments, wherein the copolymer comprises cationic species that are not covalently bound to the copolymer, the method further comprising contacting a dispersion of the copolymer with a cation exchange resin having acidic protons, and exchanging at least a portion of the cationic species with the protons to provide cation-exchanged dispersion.

In a forty-first embodiment, the present disclosure provides the method of any one of the thirty-fourth to fortieth embodiments, further comprising spray drying the copolymer.

In a forty-second embodiment, the present disclosure provides the method of any one of the thirty-fourth to forty-first embodiments, further comprising post-fluorinating the copolymer.

In a forty-third embodiment, the present disclosure provides a method of the forty-second embodiment, further comprising treating the post-fluorinated copolymer with ammonia to provide —SO₂—NH₂ groups on the copolymer.

In a forty-fourth embodiment, the present disclosure provides the method of the forty-third embodiment, further comprising treating the copolymer with a disulfonyl fluoride or disulfonyl chloride.

In order that this disclosure can be more fully understood, the following examples are set forth. It should be understood that these examples are for illustrative purposes only and are not to be construed as limiting this disclosure in any manner.

EXAMPLES

All materials are commercially available, for example from Sigma-Aldrich Chemical Company; Milwaukee, Wis., or known to those skilled in the art unless otherwise stated or apparent. The following abbreviations are used in this section: L=liters, mL=milliliters, g=grams, min=minutes, rpm=revolutions per minute, sec=seconds, h=hours, mol=moles, mol %=mole percent, wt %=weight percent, nm=nanometer, gm=micrometer, mm=millimeter, cm=centimeter, ppm=parts per million, NMR=nuclear magnetic resonance, ° C.=degrees Celsius, kPa=kiloPascal, mW=milliWatt, kcps=thousand counts per second.

Results were obtained using the following test methods, unless otherwise noted.

Solid Content

Solid content was determined gravimetrically by placing samples of the dispersions on a heated balance and recording the mass before and after evaporation of solvent. The solid content was the ratio of the initial mass of the sample and the mass of the sample when the mass did not decrease further with continued heating.

Equivalent Weight (EW)

The EW of a copolymer of TFE, a sulfonyl fluoride monomer (M2), and a vinyl ether or allyl ether monomer (M3) can be calculated by the formula:

$$EW = \left( \frac{\left( \text{mol \% } TFE + \left( \frac{\text{molar mass } M3}{\text{molar mass } TFE} \right) \times \text{mol \% } M3 \right)}{\text{mol \% } M2 + \text{molar mass } M2} \right) \times 100$$

Copolymer Composition $^{19}$F-NMR spectra were used to determine the composition of the purified polymers. An NMR spectrometer available under the trade designation AVANCE II 300 from Broker, Billerica, Mass., USA with a 5 mm Broadband probe was used. Samples of about 13 weight percent polymer dispersion were measured at 60° C.

Determination of Carboxyl Endgroups

A Fourier transform infrared spectroscopy (FT-IR) measurement can used to determine the number of carboxyl endgroups per $10^6$ C-atoms in the copolymer. The measurement is performed by FT-IR in a transmission technique. The measured sample has a film thickness of 100 μm. The wave numbers of the COOH peaks of interest are 1776 cm$^{-1}$ and 1807 cm$^{-1}$. The wave number of the C(0)F peak is 1885 cm$^{-1}$. (C(O)F will convert to a carboxyl group). To quantify the amount of carboxyl C(O)F) endgroups of the polymer two IR spectra are taken. One from the carboxyl containing sample and one from a reference sample (without carboxyl groups).

The number of endgroups per $10^6$ carbon atoms can be calculated via equation 1, 2 and 3 for $F_1$, $F_2$ and $F_3$:

(peak high×$F_1$)/film thickness [mm]     (1)

(peak high×$F_2$)/film thickness [mm]     (2)

(peak high×$F_3$)/film thickness [mm]     (3)

with $F_1$: calculated factor related to the reference spectrum and ν=1776 cm$^{-1}$ $F_2$: calculated factor related to the reference spectrum and ν=1807 cm$^{-1}$ $F_3$: calculated factor related to the reference spectrum and ν=1885 cm$^{-1}$ The sum of the results from the equations 1 to 3 yield the number of carboxyl endgroups per $10^6$ carbon atoms.

Particle Size by Dynamic Light Scattering

The particle size determination was conducted by dynamic light scattering according to ISO 13321 (1996). A Zeta Sizer Nano ZS, available from Malvern Instruments Ltd, Malvern, Worcestershire, UK, equipped with a 50 mW laser operating at 532 nm was used for the analysis. 12 mm square glass cuvettes with round aperture and cap (PCS 8501, available from Malvern Instruments Ltd) were used to mount a sample volume of 1 mL. Since light scattering of surfactants is extremely sensitive to the presence of larger particles, e.g. dust particles, the presence of contaminants was minimized by thoroughly cleaning the cuvettes before the measurements. The cuvettes were washed with freshly-distilled acetone for 8 h in a cuvette washing device. Dust discipline was also applied to the samples by centrifuging the surfactant solutions in a laboratory centrifuge at 14,500 G (142,196 N/kg) for 10 min prior to the measurements. The measuring device was operated at 25° C. in 173° backscattering mode. Low correlation times of t<$1^{-6}$ sec were enabled by the research tool (the research tool is a software up-grade of the standard instrument provided by the supplier). In order to exploit the complete scattering ability of the sample volume, the following settings were applied in all cases: "attenuator," 11; "measurement position," 4.65 mm (center of the cell). Under these conditions, the baseline scattering of pure water (reference) is around 250 kcps. Each measurement consisting of 10 sub-runs was repeated for five times. The particle sizes are expressed as $D_{50}$ value.

Melt Flow Index

The melt flow index (MFI), reported in g/10 min, was measured with a Goettfert MPD, MI-Robo, MI4 melt indexer (Buchen, Germany) following a similar procedure to that described in DIN EN ISO 1133-1 at a support weight of 5.0 kg and a temperature of 265° C. The MFI was obtained with a standardized extrusion die of 2.1 mm in diameter and a length of 8.0 mm.

T(α) Measurement

A TA Instruments AR2000 EX rheometer was used to measure the T(α) of the polymer samples. Samples were heated on a temperature ramp from −100° C. to about 125° C. at 2° C. per minute. Measurements were made at a frequency of one hertz.

Glass Transition Temperature

A TA Instruments Q2000 DSC was used to measure the glass transition temperature (Tg) of the polymer samples. Samples were heated on a temperature ramp from −50° C. to about 200° C. at 10° C. per minute. Transition temperatures were analyzed on the second heats.

Oxygen Permeability

The oxygen permeability as a function of temperature for each membrane was determined using the time lag method. The membranes with an active area of 1 cm$^2$ were placed in a permeability cell. Both chambers of the cell were subsequently evacuated for 6 hours. Time zero for the test coincided with the pressurization of upper chamber to 760 cm Hg with the challenging gas (oxygen). The variation of the pressure as a function of time in the evacuated lower chamber was measured using a pressure sensor (Baratron®, MKS, MA, USA) with a sensitivity of 10$^{-3}$ cm Hg.

The oxygen permeability P in barrer (cm$^3_{stp}$ cm/sec cm$^2$ cm Hg) was calculated using the following expression:

$$P = [V_b l / ATRp_a] dp_b/dt$$

where $V_b$ is the volume of the lower chamber in cm$^3$, l is the membrane thickness in cm, A the exposed surface area of the membrane in cm$^2$, T is temperature in ° K, $p_a$ is the pressure of the upper chamber in cm Hg, R is the gas constant (6236.367 cm Hg cm$^3$/mol ° K), and $dp_b/dt$ is the rate of change of the pressure in the lower chamber as a function of time measured in the linear part of the pressure—time curve (cm Hg/sec).

Example 1 (EX-1)

A polymer of tetrafluoroethylene (TFE), $F_2C$=CF—O—$CF_2CF_2CF_2CF_2SO_2F$ (MV4S), and $CF_2$=CF—O—$(CF_2)_3$—$OCF_3$ (MV31) was prepared:

MV4S was prepared according to the method described in U.S. Pat. No. 6,624,328 (Guerra). MV31 was prepared according to the method described in U.S. Pat. No. 6,255,536 (Worm et al.)

A 4-L polymerization kettle equipped with an impeller agitator system was charged with ammonium oxalate monohydrate (5 g) and oxalic acid dihydrate (1 g) in $H_2O$ (2000 g) and 40 g of a 30 wt. % aqueous solution of $CF_3$—O—$(CF_2)_3$—O—CFH—$CF_2$—$COONH_4$, prepared as described in "Preparation of Compound 11" in U.S. Pat. No. 7,671,112. The kettle was degassed and subsequently charged with nitrogen several times to assure that all of oxygen was removed. Afterwards, the kettle was purged with TFE. The kettle was then heated to 50° C. and the agitation system was set to 320 rpm. A mixture of MV4S (260 g), MV31 (50 g), and 8.6 g of the 30 wt. % $CF_3$—O—$(CF_2)_3$—O—CFH—$CF_2$—$COONH_4$ solution and deionized water (165 g) were emulsified under high shear by an agitator available under the trade designation "ULTRA-TURRAX 150" from IKA Works, Wilmington, N.C., USA operated at 24000 rpm for 2 min. The MV4S and MV31 emulsion was charged into the reaction kettle. The kettle was further charged with TFE (127 g) to a pressure of 6 bar (600 kPa). The polymerization was initiated by a 0.045% solution of $KMnO_4$ (33 g) in deionized water. As the reaction started, the reaction temperature of 50° C. as well as the reaction pressure of 6 bar (600 kPa) were maintained by feeding TFE into the gas phase. After the first pressure drop, the continuous feeding of the MV4S and MV31 emulsion (in total 1037 g: 557 g MV4S and 106 g MV31 and 21 g of the 30% $CF_3$—O—$(CF_2)_3$—O—CFH—$CF_2$—$COONH_4$ solution in 353 g deionized water), TFE (458 g), and of a 0.045% solution of $KMnO_4$ in deionized water (350 g) was continued. The molar ratio of the continuous feed was 72 mol % TFE, 23 mol % MV4S and 5 mol % MV31. The average metering rate of the continuous addition of the 0.045% $KMnO_4$ solution was 92 g/h to obtain a polymer dispersion with a solid content of 23.2%. The polymerization time was 228 min. The latex particle diameter was 126 nm according to dynamic light scattering.

The polymer dispersion was charged into a 100L glass vessel equipped with a lab stirrer (PENDRAULIK). While the lab stirrer of the glass vessel was rotated to 2500 rpm, a 65 wt-% nitric acid (170 g) was fed continuously in the glass vessel to precipitate the polymer. Then the mixture was rotated for 1 h under the same stirring conditions with a final solid content of 1.4% in the polymerization medium (water phase).

The remaining aqueous polymerization medium was removed and the wet polymerization crumb was washed seven times with 4 L DI water while the stirrer was rotated to 930 rpm. The pH value of the seventh washing medium was nearly 4. The wet polymerizate was transferred in two portions in an air circulation dryer. Each portion was dried for 17 hours at 80° C. with a final water content of ≤0.1% determined by thermobalance.

The coagulated, washed, and dried polymer had a MFI (265° C./5 kg) of 41 g/10 min. The polymer had a composition of 70.3 mol % TFE, 24.4 mol-% MV4S and 5.3 mol % MV31 as determined by $^{19}F$-NMR-spectroscopy. This corresponds to an equivalent weight EW of 740. The glass transition temperature (Tg) was measured using the test method described above and found to be 3° C.

Hydrolysis of the polymer was done in a Parr 4554 2-Gallon Floor Stand Reactor equipped with a Parr 4848 Reactor Controller, 2700W Heater, a Parr Magnetic Drive Mixer, and a Neslab Thermoflex 2500 chiller for cooling.

The reactor was charged with 1.5 L of deionized (DI) water, 24 g of LiOH*$H_2O$, 14.1 g of $Li_2CO_3$, and 141 g of the polymer. The vessel was sealed, and the mixer was set to 300 rpm. The reactor was then heated to 255° C. over a period of 111 minutes. This temperature was held for 60 minutes. It was then cooled to 25° C. over 23 minutes, and upon reaching this temperature the mixer was shut off. The dispersion was drained from the reactor into 4 L HDPE bottles and allowed to rest overnight.

The dispersion was passed through an ion exchange bed consisting of a Kimble Chromaflex Column with the dimensions of 38×500 mm filled with 300 mL of Amberlite IR-120(Plus) Hydrogen Form Ion Exchange Resin. The resin was prepared by first flushing the column with 3 L of DI water with the stop cock completely open. After 900 mL of 5% HCl solution was passed through the column over 30 minutes followed by 600 mL of DI water over 20 minutes. Next 3 L of DI water was passed through with the stop cock fully open. The dispersion was then ion exchanged at a rate of 1200 mL per hour. Any precipitate that formed after hydrolysis was not fed into the ion exchange column. The resin was regenerated after every 400 mL of dispersion using the same process outlined above.

To dry the ionomer and prepare solvent and water based dispersions, 20 to 25 mL of the ion exchanged dispersion was placed into a 40-mL HDPE bottle. The open bottle was placed in a muffle furnace set to 70° C. where it remained for 20 to 24 hours until the moisture content dropped below 10%, and the ionomer was a friable solid. Once the dispersion had dried, the final moisture content was determined, and n-propanol and DI $H_2O$ with 18.2 MOhm-cm resistivity were added. In this example 1.96 g of ionomer was combined with 4.32 g of n-propanol and 2.72 g of $H_2O$ to achieve a dispersion consisting of 20% ionomer, 48% n-propanol, and 32% water. The bottle was then placed on a roller set to 45 to 65 rpm for a period of 24 hours. A clear dispersion was formed with no visible undispersed material.

To make a membrane, dispersion was concentrated by rotary evaporation to near solids and then exposed to a stream of nitrogen gas. The dried ionomer was dispersed at 28-30 wt % into a 60/40 blend of n-propanol and water at room temperature. The solution was coated onto 2 mil (50.8 micrometer) thickness "KAPTON" polyimide liner secured to a glass substrate. The film was dried at 120° C. for 30 minutes and then transferred from the glass substrate to an aluminum pan. Drying was continued 140° C. for 15 minutes, ramped to 160° C. for 10 minutes, and then cooled to room temperature.

The T($\alpha$) was measured according to the test method above and determined to be 98° C.

The membrane was evaluated at 30° C. using the Oxygen Permeability evaluation method described above. A value of 161 (barrer×$10^{10}$) was measured. The oxygen permeability at 50° C. and 70° C. was found to be higher than the detection limit.

Example 2 (EX-2)

A polymer of tetrafluoroethylene (TFE), $F_2C$=CF—O—$CF_2CF_2CF_2CF_2SO_2F$ (MV4S), and $CF_2$=CF—O—$(CF_2)_3$—$OCF_3$ (MV31) was prepared:

MV4S and MV31 were prepared as described in Example 1.

A 4-L polymerization kettle equipped with an impeller agitator system was charged with ammonium oxalate monohydrate (5 g) and oxalic acid dihydrate (1 g) in $H_2O$ (2000 g) and 40 g of a 30 wt. % aqueous solution of $CF_3$—O—

(CF$_2$)$_3$—O—CFH—CF$_2$—COONH$_4$. The kettle was degassed and subsequently charged with nitrogen several times to assure that all of oxygen was removed.

Afterwards, the kettle was purged with TFE, The kettle was then heated to 50° C. and the agitation system was set to 320 rpm. A mixture of MV4S (237 g), MV31 (78 g), and 9.6 g of the 30 wt. % CF$_3$—O—(CF$_2$)$_3$—O—CFH—CF$_2$—COONH$_4$ solution and deionized water (147 g) were emulsified under high shear by an agitator available under the trade designation "ULTRA-TURRAX T 50" from IKA Works, operated at 24000 rpm for 2. min. The MV4S and MV31 emulsion was charged into the reaction kettle, The kettle was further charged with TFE (126 g) to a pressure of 6 bar (600 kPa). The polymerization was initiated by a 0.045% solution of KMnO$_4$ (20 g) in deionized water. As the reaction started, the reaction temperature of 50° C. as well as the reaction pressure of 6 bar (600 kPa) were maintained by feeding TFE into the gas phase. After the first pressure drop, the continuous feeding of the MV4S and MV31 emulsion (in total 1128 g: 567 g NEWS and 187 g MV31 and 23 g of the 30% CF$_3$—O—(CF$_2$)$_3$—O—CFH—CF$_2$—COONH$_4$-sol anon in 351 g deionized water), TFE (351 g), and of a 0.045% solution of KMnO$_4$ in deionized water (120 g) was continued. The average metering rate of the continuous addition of the 0.045% KMnO$_4$ solution was 37 g/h to obtain a polymer dispersion with a solid content of 19.7%. The polymerization. time was 194 min. The latex particle diameter was 114 nm according to dynamic light scattering.

The copolymer was coagulated, washed, and dried similarly to Example 1. The coagulated, washed, and dried polymer had a MFI (265° C./5 kg) of 57 g/10 min. The calculated equivalent weight EW was 742.

Illustrative Example 3 (Ill. EX-3)

A polymer of tetrafluoroethylene (TFE), F$_2$C=CF—O—CF$_2$CF$_2$CF$_2$CF$_2$SO$_2$F (MV4S), and CF$_2$=CF—O—(CF$_2$)$_2$—CF$_3$ (PPVE-1) was prepared:

A 4-L polymerization kettle with an impeller agitator system was charged with 5 g ammonium oxalate monohydrate and 1 g oxalic acid dihydrate in 2000 g H$_2$O and 40 g of a 30 wt. % aqueous solution of CF$_3$—O—(CF$_2$)$_3$—O—CFH—CF$_2$—COONH$_4$. The kettle was degassed and subsequently charged with nitrogen several times to assure that all of oxygen was removed. Afterwards, the kettle was purged with TFE. The kettle was then heated to 50° C. and the agitation system was set to 320 rpm. A mixture of 80 g MV4S, 2.7 g of a 30 wt. % CF$_3$—O—(CF$_2$)$_3$—O—CFH—CF$_2$—COONH$_4$ solution and 51 g deionized water were emulsified under high shear by a "ULTRA-TURRAX T 50" agitator from IKA Works operated at 24000 rpm for 2 min. The MV4S-emulsion was charged into die reaction kettle. The kettle was further charged with 114 g TM and 40 g PPVE-1 to 6 bar pressure (600 kPa). The polymerization was initiated by 16 g of a 0.09% solution of potassium permanganate (KMnO$_4$) in deionized water. As the reaction started, the reaction temperature of 50° C. as well as the reaction pressure of 6 bar (600 kPa) was maintained by feeding TFE arid PPVE-1 into the gas phase. After the first pressure drop the continuous feeding of 190 g of the MV4S-emulsion (114 g MV4S and 4 g of a 30 wt. % CF$_3$—O—(CF$_2$)$_3$—O—CFH—CF$_2$—COONH$_4$ solution in 72 g deionized water), 193 g TFE, 121 g PPVE-1, and 235 g of a 0.09% solution of KMnO$_4$ in deionized water was continued. The average metering rate of the continuously addition of the 0.09% KMnO$_4$ solution was 123 g/h to obtain a polymer dispersion with a solid content of 14.1%. The polymerization time was 115 mm and latex particle diameter was 150 nm according to dynamic light scattering.

The copolymer was coagulated, washed, and dried similarly to Example 1. The coagulated, washed, and dried polymer had a MFI (265° C./5 kg) of 66 g/10 min. The polymer showed a chemical composition of 74.2 mol-% TFE, 16.1 mol-% MV4S and 9.7 mol-% PPVE-1 as determined by $^{19}$F-NMR-spectroscopy. This corresponds to an equivalent weight of 1000. The glass transition temperature (Tg) was measured using the test method described above and found to be 10° C.

The polymer was hydrolyzed similarly to Example 1 except 16.2 g of LiOH*H$_2$O, 9.5 g of Li$_2$CO$_3$ and 129 g of the polymer was charged into the reactor. The reactor was then heated to 255° C. over a period of 114 minutes. The dispersion was ion exchanged, dried, and an n-propanol based dispersion was prepared similarly to Example 1. In Example 2, 2.14 g of ionomer was combined with 4.70 g of n-propanol and 2.96 g DI H$_2$O. A clear dispersion was formed with no visible undispersed material.

A membrane was made similarly to Example 1. The T($\alpha$) was measured according to the test method above and determined to be 93° C. The membrane was evaluated at 30° C. using the Oxygen Permeability evaluation method described above. A value of 2.6 (barrer×10$^{10}$) was measured. The oxygen permeability at 50° C. and 70° C. was found to be 5.8 and 10.1 (barrer×10$^{10}$), respectively.

Comparative Example A

A polymer of tetrafluoroethylene (TFE) and F$_2$C=CF—O—CF$_2$CF$_2$CF$_2$CF$_2$SO$_2$F (MV4S) was prepared:

MV4S was prepared as described above.

A 4-L polymerization kettle equipped with an impeller agitator system was charged with ammonium oxalate monohydrate (5 g) and oxalic acid dihydrate (1 g) in H$_2$O (2000 g) and 40 g of a 30 wt. % aqueous solution of CF$_3$—O—(CF$_2$)$_3$—O—CFH—CF$_2$—COONH$_4$. The kettle was degassed and subsequently charged with nitrogen several times to assure that all of oxygen was removed. Afterwards, the kettle was purged with TEE. The kettle was then heated to 50° C. and the agitation system was set to 320 rpm. A mixture of MV4S (200 g), 15 g of the 30 wt. % CF$_3$—O—(CF$_2$)$_3$—O—CFH—CF$_2$—COONH$_4$ solution and deionized water (360 g) were emulsified under high shear by an agitator available under the trade designation. "ULTRA-TURRAX T 50" from IKA Works operated at 24000 rpm for 2 mM. The MV4S emulsion was charged into the reaction kettle. The kettle was further charged with TFE (115 g) to a pressure of 6 bar (600 kPa). The polirierization was initiated by a 0.06% solution of KMnO$_4$ (13 g) in deionized water. As the reaction started, the reaction temperature of 50° C. as well as the reaction pressure of 6 bar (600 kPa) were maintained by feeding TFE into the gas phase. After the first pressure drop, the continuous feeding of the MV4S emulsion (in total 1234 g: 630 g MV4S and 24 g of the 30% CF$_3$—O—(CF$_2$)$_3$—O—CFH—CF$_2$—COONH$_4$-solution in 580 g deionized water), TFE (450 g), and of a 0.045% solution of KMnO$_4$ in deionized water (297 g) was continued. The average metering rate of the continuous addition of the 0.06% KMnO$_4$ solution was 80 g/h to obtain a polymer dispersion with a solid content of 22%. The polymerization time was 232 min. The latex particle diameter was 75 nm according to dynamic light scattering.

4.1 kg of the polymer dispersion with a solid content of 22% was charged into a 10-L glass vessel equipped with a lab stirrer (PENDRAULIK). While the lab stirrer of the glass vessel was rotated to 2500 rpm, a 65 wt-% nitric acid (170 g) was fed continuously in the glass vessel to precipitate the polymer. Then the mixture was rotated for 1 h under the same stirring conditions with a final solid content of 1.4% in the polymerization medium (water phase). The remaining aqueous polymerization medium was removed and the wet polymerization crumb was washed seven times with 4 liter DI water while the stirrer was rotated to 930 rpm. The pH value of the seventh washing medium was nearly 4.

The wet polymerizate was transferred in two portions in an air circulation dryer. Each portion was dried for 17 hours at 80° C. with a final water content of ≤0.1% determined by thermobalance. The yield of dried polymer of the was 840 g.

The copolymer was coagulated, washed, and dried similarly to Example 1. The coagulated, washed, and dried polymer had a MFI (265° C./5 kg) of 38 g/10 min. The so-obtained polymer showed a chemical composition of 78 mol-% TFE, 22 mol-% MV4S as determined by $^{19}$F-NMR-spectroseopy This corresponds to an equivalent weight of 734.

The polymer was hydrolyzed similarly to Example 1 except the reactor was charged with 4 L of DI water, 200 g of LiOH*H$_2$O, 100 g of Li$_2$CO$_3$, and 1000 g of the polymer. The dispersion was ion exchanged and dried similarly to Example 1. A dispersion was prepared similarly to Example 1. The dispersion was clear with no visible undispersed material, however the dispersion was very viscous. To prepare a membrane, another dispersion consisting of 20 wt % solids dispersed in ethanol:water at a ratio 55:45 was prepared. A clear dispersion was formed with no visible undispersed material. The dispersion was coated similarly to Example 1 except the film was dried at 80° C. for 10 minutes and then at 200° C. for 15 minutes. The T(α) was measured according to the test method above and determined to be 104° C.

A dispersion consisting of 15 wt % ionomer, 46.75% n-propanol, and 38.25% water was prepared similarly to Example 1. A clear dispersion was formed with no visible undispersed material. A membrane was made similarly to Example 1 except the film was dried at 90° C. for 10 minutes and then at 100° C. for 15 minutes, and then ramped to 190° C. for 12 minutes, and then cooled to room temperature. The membrane was evaluated at 30° C. using the Oxygen Permeability evaluation method described above. A value of 0.64 (barrer×10$^{10}$) was measured. The oxygen permeability at 50° C. and 70° C. was found to be 1.4 and 2.8 (barrer×10$^{10}$), respectively.

Various modifications and alterations of this disclosure may be made by those skilled in t art without departing from the scope and spirit of the disclosure, and it should be understood that this disclosure is not to be unduly limited to the illustrative embodiments set forth herein.

What is claimed is:

1. A copolymer comprising:
   divalent units represented by formula —[CF$_2$—CF$_2$]—;
   divalent units independently represented by formula:

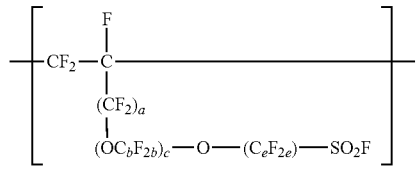

wherein a is 0 or 1, b is 2 to 8, c is 0 to 2, and e is 1 to 8; and
   one or more divalent units independently represented by formula:

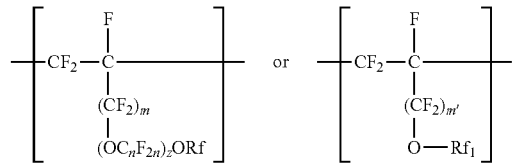

wherein Rf is a linear or branched perfluoroalkyl group having from 1 to 8 carbon atoms and optionally interrupted by one or more —O— groups, z is 1 or 2, each n is independently 1, 3, or 4, m is 0 or 1, m' is 0 or 1, and Rf$_1$ is a branched perfluoroalkyl group having from 3 to 8 carbon atoms, with the proviso that if z is 2, n may also be 2, with the proviso that if a is 1, n may also be 2, and with the further proviso that when m' is 1, Rf$_1$ is a branched perfluoroalkyl group having from 3 to 8 carbon atoms or a linear perfluoroalkyl group having 5 to 8 carbon atoms,
   wherein the copolymer has an —SO2F equivalent weight in a range from 300 to 2000, wherein the copolymer has a glass transition temperature of up to 20° C.

2. The copolymer of claim 1, wherein b is 2 or 3, c is 0 or 1, and e is 2 or 4.

3. The copolymer of claim 1, with at least one of the following further provisos:
   when a is 0, then n is not 3, or
   when a and c are 0, then e is not 2.

4. The copolymer of claim 1, wherein at least one n is 1.

5. The copolymer of claim 1, further comprising at least one of divalent units derived from chlorotrifluoroethylene or divalent units derived from hexafluoropropylene.

6. The copolymer of claim 1, wherein the copolymer comprises the divalent units independently represented by formula

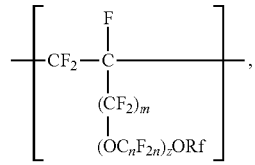

and wherein at least one of a is 1 or m is 1.

7. The copolymer of claim 1, wherein the divalent units independently represented by formula

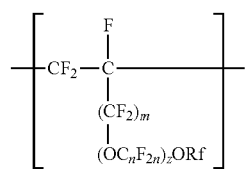

are present in a range from 3 to 20 or 4 to 15 mole percent, based on the total moles of divalent units in the copolymer.

8. The copolymer of claim 1, wherein the copolymer has an —SO$_2$F equivalent weight greater than 1000.

9. The copolymer of claim 1, wherein at least one of c is 1 or 2 or e is 3 to 8.

10. The copolymer of claim 1, wherein the copolymer comprises the divalent units independently represented by formula

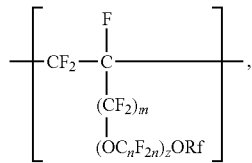

and wherein at least one of a is 1 or m is 1.

11. The copolymer of claim 1, wherein the copolymer is free of divalent units derived from $X_2C=CY-(CW_2)_m\text{-}(O)_n\text{—}R_F\text{—}(O)_o\text{-}(CW_2)_p\text{—}CY=CX_2$, where each of X, Y, and W is independently fluoro, hydrogen, alkyl, alkoxy, polyoxyalkyl, perfluoroalkyl, perfluoroalkoxy or perfluoropolyoxyalkyl, m and p are independently an integer from 0 to 15, and n, o are independently 0 or 1.

* * * * *